United States Patent
Liu et al.

(10) Patent No.: US 12,452,022 B2
(45) Date of Patent: Oct. 21, 2025

(54) MULTIPLEXING PHYSICAL SIDELINK FEEDBACK CHANNELS IN SIDELINK COMMUNICATION

(71) Applicant: QUALCOMM Incorporated, San Diego, CA (US)

(72) Inventors: Chih-Hao Liu, San Diego, CA (US); Jing Sun, San Diego, CA (US); Yisheng Xue, San Diego, CA (US); Giovanni Chisci, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 472 days.

(21) Appl. No.: 17/663,019

(22) Filed: May 11, 2022

(65) Prior Publication Data
US 2023/0370232 A1    Nov. 16, 2023

(51) Int. Cl.
*H04L 5/00* (2006.01)
*H04W 72/20* (2023.01)

(52) U.S. Cl.
CPC ........... *H04L 5/0055* (2013.01); *H04W 72/20* (2023.01)

(58) Field of Classification Search
USPC ......................................................... 370/329
See application file for complete search history.

(56) References Cited

U.S. PATENT DOCUMENTS

| 2022/0085923 A1* | 3/2022 | Ye | H04L 1/1864 |
| 2022/0201654 A1* | 6/2022 | Lee | H04L 5/0053 |
| 2023/0269056 A1* | 8/2023 | Si | H04W 76/14 370/329 |

FOREIGN PATENT DOCUMENTS

| WO | WO-2021023081 A1 * | 2/2021 | H04L 5/0044 |
| WO | WO-2021046784 A1 * | 3/2021 | H04L 5/0057 |

OTHER PUBLICATIONS

Huawei, HiSilicon, PSFCH formats for NR V2X, Apr. 8-12, 2019 (Year: 2019).*

* cited by examiner

*Primary Examiner* — Luna Weissberger
(74) *Attorney, Agent, or Firm* — Harrity & Harrity LLP

(57) ABSTRACT

Wireless communications systems, apparatuses, and methods are provided. A method of wireless communication performed by a first sidelink user equipment (UE) may include receiving, from a second sidelink UE, a configuration associated with multiplexing a first physical sidelink feedback channel (PSFCH) having a first format with a second PSFCH having a second format, wherein the second format is different from the first format, receiving, from the second sidelink UE, one or more transport blocks (TBs), and transmitting, to the second sidelink UE based on the configuration, an acknowledgement/negative-acknowledgment (ACK/NACK) associated with the one or more TBs via the first PSFCH multiplexed with the second PSFCH.

30 Claims, 11 Drawing Sheets

MULTIPLEXING PHYSICAL SIDELINK FEEDBACK CHANNELS IN SIDELINK COMMUNICATION

TECHNICAL FIELD

This application relates to wireless communication systems, and more particularly, to multiplexing physical sidelink feedback channels in sidelink communication.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR can be deployed in a standalone NR mode over a licensed and/or an unlicensed band or in a dual connectivity mode with various combinations of NR and LTE over licensed and/or unlicensed bands.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed frequency bands and/or unlicensed frequency bands (e.g., shared frequency bands).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a first sidelink user equipment (UE) may include receiving, from a second sidelink UE, a configuration associated with multiplexing a first physical sidelink feedback channel (PSFCH) having a first format with a second PSFCH having a second format, wherein the second format is different from the first format, receiving, from the second sidelink UE, one or more transport blocks (TBs), and transmitting, to the second sidelink UE based on the configuration, an acknowledgement/negative-acknowledgment (ACK/NACK) associated with the one or more TBs via the first PSFCH multiplexed with the second PSFCH.

In an additional aspect of the disclosure, a method of wireless communication performed by a first sidelink user equipment (UE) may include transmitting, to a second sidelink UE, a configuration associated with multiplexing a first physical sidelink feedback channel (PSFCH) having a first format with a second PSFCH having a second format, wherein the second format is different from the first format, transmitting, to the second sidelink UE, one or more transport blocks (TBs), and receiving, from the second sidelink UE, an acknowledgement/negative-acknowledgment (ACK/NACK) associated with the one or more TBs via the first PSFCH multiplexed with the second PSFCH.

In an additional aspect of the disclosure, a first sidelink user equipment (UE) may include a memory; a transceiver; and at least one processor coupled to the memory and the transceiver, wherein the first sidelink UE is configured to receive, from a second sidelink UE, a configuration associated with multiplexing a first physical sidelink feedback channel (PSFCH) having a first format with a second PSFCH having a second format, wherein the second format is different from the first format, receive, from the second sidelink UE, one or more transport blocks (TBs) and transmit, to the second sidelink UE based on the configuration, an acknowledgement/negative-acknowledgment (ACK/NACK) associated with the one or more TBs via the first PSFCH multiplexed with the second PSFCH.

In an additional aspect of the disclosure, a first sidelink user equipment (UE) may include a memory; a transceiver; and at least one processor coupled to the memory and the transceiver, wherein the first sidelink UE is configured to transmit, to a second sidelink UE, a configuration associated with multiplexing a first physical sidelink feedback channel (PSFCH) having a first format with a second PSFCH having a second format, wherein the second format is different from the first format, transmit, to the second sidelink UE, one or more transport blocks (TBs), and receive, from the second sidelink UE, an acknowledgement/negative-acknowledgment (ACK/NACK) associated with the one or more TBs via the first PSFCH multiplexed with the second PSFCH Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention can include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances can be implemented in various devices, systems, and methods.

DETAILED DESCRIPTION

Figure 1:
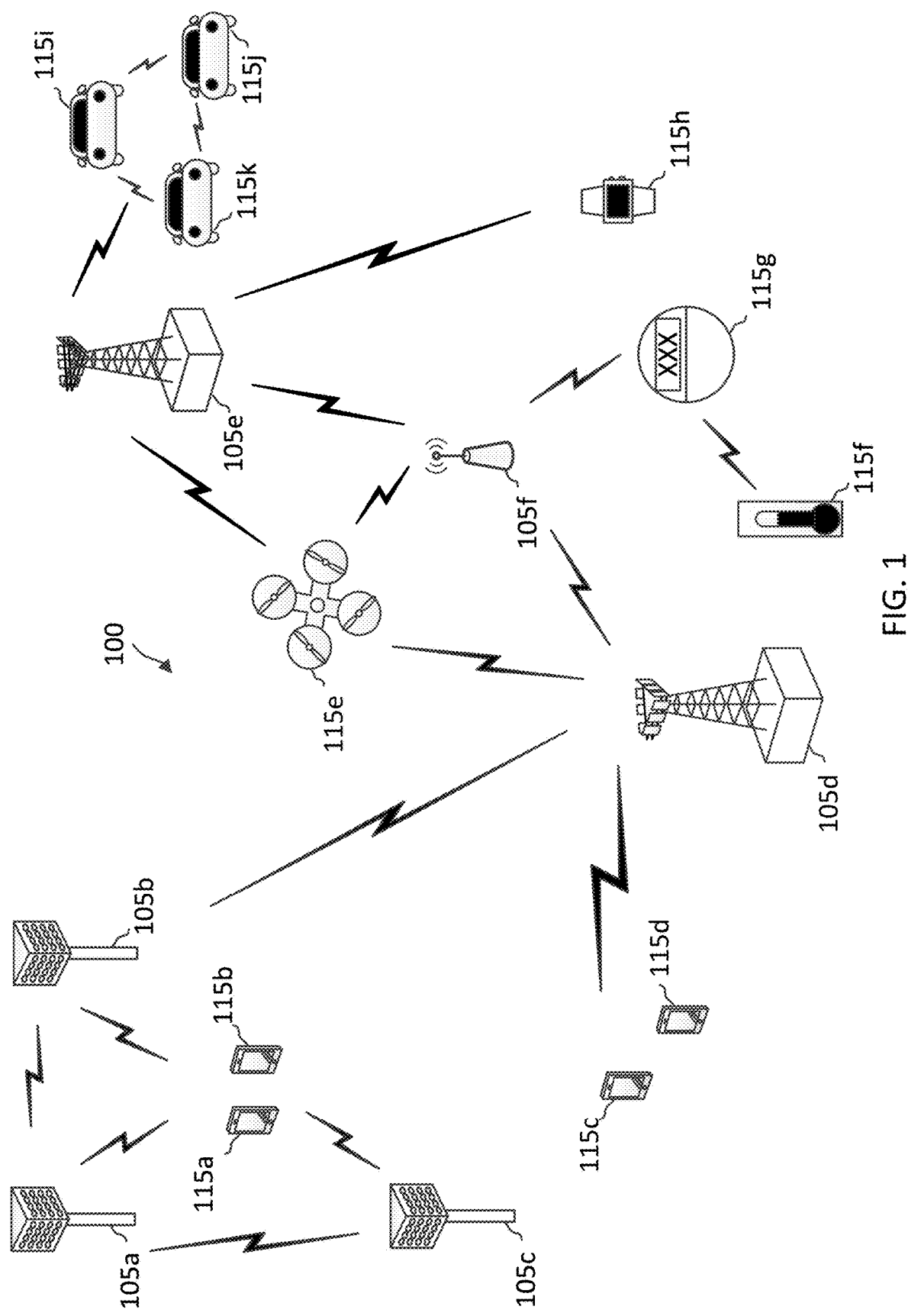
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The deployment of NR over an unlicensed spectrum is referred to as NR-unlicensed (NR-U). Federal Communications Commission (FCC) and European Telecommunications Standards Institute (ETSI) are working on regulating 6 GHz as a new unlicensed band for wireless communications. The addition of 6 GHz bands allows for hundreds of megahertz (MHz) of bandwidth (BW) available for unlicensed band communications. Additionally, NR-U can also be deployed over 2.4 GHz unlicensed bands, which are currently shared by various radio access technologies (RATs), such as IEEE 802.11 wireless local area network (WLAN) or WiFi and/or license assisted access (LAA). Sidelink communications may benefit from utilizing the additional bandwidth available in an unlicensed spectrum. However, channel access in a certain unlicensed spectrum may be regulated by authorities. For instance, some unlicensed bands may impose restrictions on the power spectral density (PSD) and/or minimum occupied channel bandwidth (OCB) for transmissions in the unlicensed bands. For example, the unlicensed national information infrastructure (UNIT) radio band has a minimum OCB requirement of about at least 70 percent (%).

Some sidelink systems may operate over a 20 MHz bandwidth, e.g., for listen before talk (LBT) based channel accessing, in an unlicensed band. ABS may configure a sidelink resource pool over one or multiple 20 MHz LBT sub-bands for sidelink communications. A sidelink resource pool is typically allocated with multiple frequency subchannels within a sidelink band width part (SL-BWP) and a sidelink UE may select a sidelink resource (e.g., one or multiple subchannels in frequency and one or multiple slots in time) from the sidelink resource pool for sidelink communication.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a vehicle (e.g., a car, a truck, a bus, an autonomous vehicle, an aircraft, a boat, etc.). Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-hop configurations by communicating with another user device which relays its information to the network, such as the UE 115*f* communicating temperature measurement information to the smart meter, the UE 115*g*, which is then reported to the network through the small cell BS 105*f*. In some aspects, the UE 115*h* may harvest energy from an ambient environment associated with the UE 115*h*. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115*i*, 115*j*, or 115*k* and other UEs 115, and/or vehicle-to-infrastructure (V2I) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes, for example, about 10. Each subframe can be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

The network 100 may be designed to enable a wide range of use cases. While in some examples a network 100 may utilize monolithic base stations, there are a number of other architectures which may be used to perform aspects of the present disclosure. For example, a BS 105 may be separated into a remote radio head (RRH) and baseband unit (BBU). BBUs may be centralized into a BBU pool and connected to RRHs through low-latency and high-bandwidth transport links, such as optical transport links. BBU pools may be cloud-based resources. In some aspects, baseband processing is performed on virtualized servers running in data centers rather than being co-located with a BS 105. In another example, based station functionality may be split between a remote unit (RU), distributed unit (DU), and a central unit (CU). An RU generally performs low physical layer functions while a DU performs higher layer functions, which may include higher physical layer functions. A CU performs the higher RAN functions, such as radio resource control (RRC).

For simplicity of discussion, the present disclosure refers to methods of the present disclosure being performed by base stations, or more generally network entities, while the functionality may be performed by a variety of architectures other than a monolithic base station. In addition to disaggregated base stations, aspects of the present disclosure may also be performed by a centralized unit (CU), a distributed unit (DU), a radio unit (RU), a Near-Real Time (Near-RT) RAN Intelligent Controller (RIC), a Non-Real Time (Non-RT) RIC, integrated access and backhaul (IAB) node, a relay node, a sidelink node, etc.

In some aspects, the UE 115$k$ may transmit, to the UE 115$j$, a configuration associated with multiplexing a first physical sidelink feedback channel (PSFCH) having a first format with a second PSFCH having a second format. The second format may be different from the first format. The UE 115$k$ may transmit, to the UE 115$j$, one or more transport blocks (TBs). The UE 115$k$ may receive, from the UE 115$j$, an acknowledgement/negative-acknowledgment (ACK/NACK) associated with the one or more TBs via the first PSFCH multiplexed with the second PSFCH.

Figure 2:
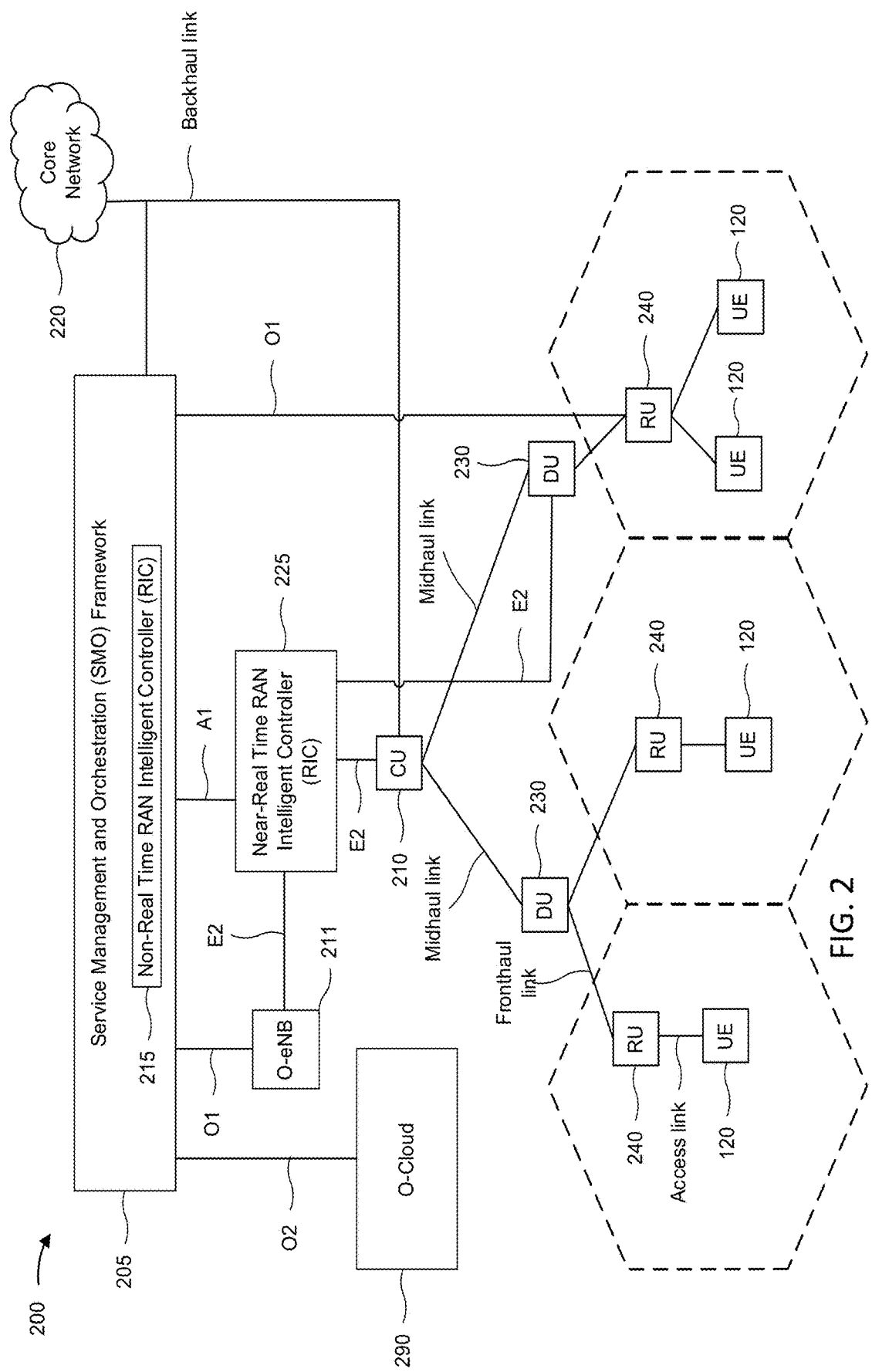
FIG. 2 illustrates an example disaggregated base station architecture according to some aspects of the present disclosure.

FIG. 2 shows a diagram illustrating an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) RIC 215 associated with a Service Management and Orchestration (SMO) Framework 205, or both). A CU 310 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 120 via one or more radio frequency (RF) access links. In some implementations, the UE 120 may be simultaneously served by multiple RUs 240.

Each of the units, i.e., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 120. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

In some aspects, a first UE 120 may transmit, to a second UE 120, a configuration associated with multiplexing a first physical sidelink feedback channel (PSFCH) having a first format with a second PSFCH having a second format. The second format may be different from the first format. The first UE 120 may transmit, to the second UE 120, one or more transport blocks (TBs). The UE first UE 120 may receive, from the second UE 120, an acknowledgement/negative-acknowledgment (ACK/NACK) associated with the one or more TBs via the first PSFCH multiplexed with the second PSFCH.

Figure 3:
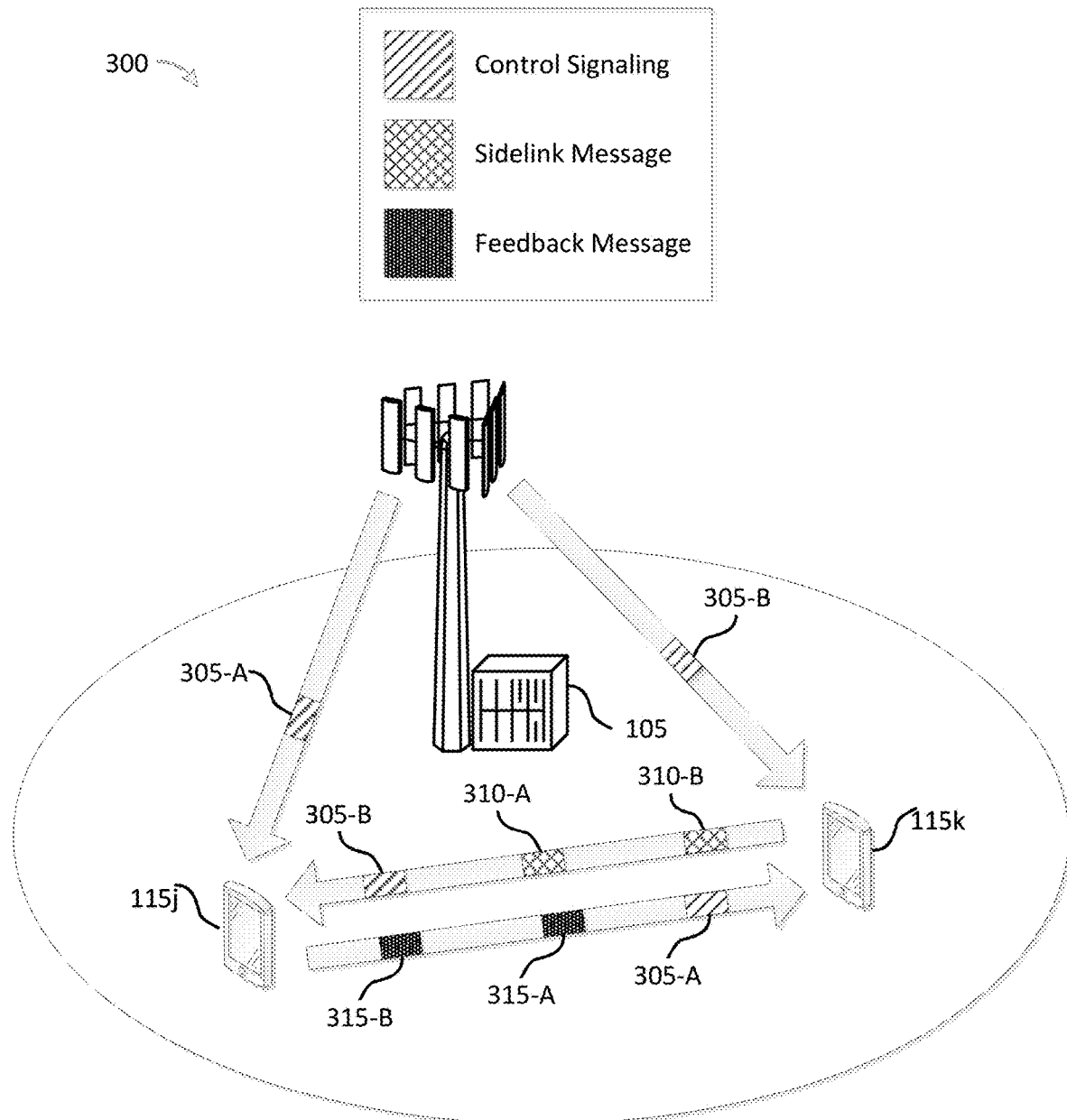
FIG. 3 illustrates a sidelink wireless communication network according to some aspects of the present disclosure.

FIG. 3 illustrates a sidelink wireless communication system 300 according to some aspects of the present disclosure. Wireless communications system 300 may support techniques for enhanced sidelink feedback transmission in accordance with aspects of the present disclosure. The wireless communications system 300 may implement or be implemented by aspects of the wireless communications system 100 and/or 200. For example, the wireless communications system 300 may include a UE 115j, a UE 115k, and a base station 105, which may be examples of corresponding devices described with reference to FIGS. 1 and 2. The UEs 115 and the base station 105 may communicate within a geographic coverage area. In the wireless communications system 300, the UE 115j may generate one or more sidelink type 2 HARQ ACK codebooks that include ACK or NACK bits corresponding to sidelink messages 210.

The wireless communications system 300 may support sidelink communications between the UE 115j (e.g., a destination UE) and the UE 115k (e.g., a source UE). For example, the UE 115k may transmit sidelink messages 310 to the UE 115j over PSSCH resources, and the UE 115j may transmit feedback messages 215 to the UE 115j over multiplexed PSFCH resources. The feedback messages 215 may include HARQ ACK feedback (e.g., ACK or NACK bits) corresponding to the sidelink messages 310. To support transmission of the feedback messages 215 on PSFCH resources, the base station 105 may transmit control signaling 305a to the UE 115j. Similarly, the base station 105 may transmit control signaling 305b to the UE 115k. In some examples, the UE 115j may relay the control signaling 305a to the UE 115k in accordance with a sidelink communication scheme. Likewise, the UE 115k may relay the control signaling 305b to the UE 115j in accordance with a sidelink communication scheme.

In some examples, the control signaling 305 may include RRC signaling that indicates a minimum PSFCH gap time (e.g., a minimum time duration between PSSCH transmission and PSFCH transmission), a PSFCH periodicity (e.g., a number of slots between PSFCH resources), a mapping between PSSCH resources and PSFCH resources, a PSFCH resource pool configuration, an algorithm for identifying PSFCH resources based on identifiers of the UEs 115, or a combination thereof. The control signaling 305 may also indicate a sidelink feedback configuration, which the UE 115j may use for sidelink type 2 HARQ ACK codebook generation. For example, the control signaling 305 may indicate whether to include ACK or NACK bits for sidelink messages associated with different priority levels (e.g., PSSCH priority levels) or groups (e.g., unicast PSSCH groups, groupcast PSSCH groups) in a joint type 2 HARQ ACK codebook or in separate type 2 HARQ ACK codebooks. Additionally or alternatively, the control signaling 305 may indicate whether PSFCH resources in format PF0 should be multiplexed with PSFCH resources in format PF2.

The UE 115k may transmit a sidelink message 310a to the UE 115j on a first PSSCH resource, and may transmit a sidelink message 310b to the UE 115j on a second PSSCH resource. In some examples, the sidelink messages 310 may be multiplexed with respective PSCCH transmissions that include SCI related to the sidelink messages 310. For example, the SCI (e.g., piggyback SCI) may indicate one or more of a total sidelink assignment index, a counter sidelink assignment index, an ACK feedback indicator, a group index, a priority level, or a HARQ ACK feedback trigger for the sidelink messages 310.

Figure 4:
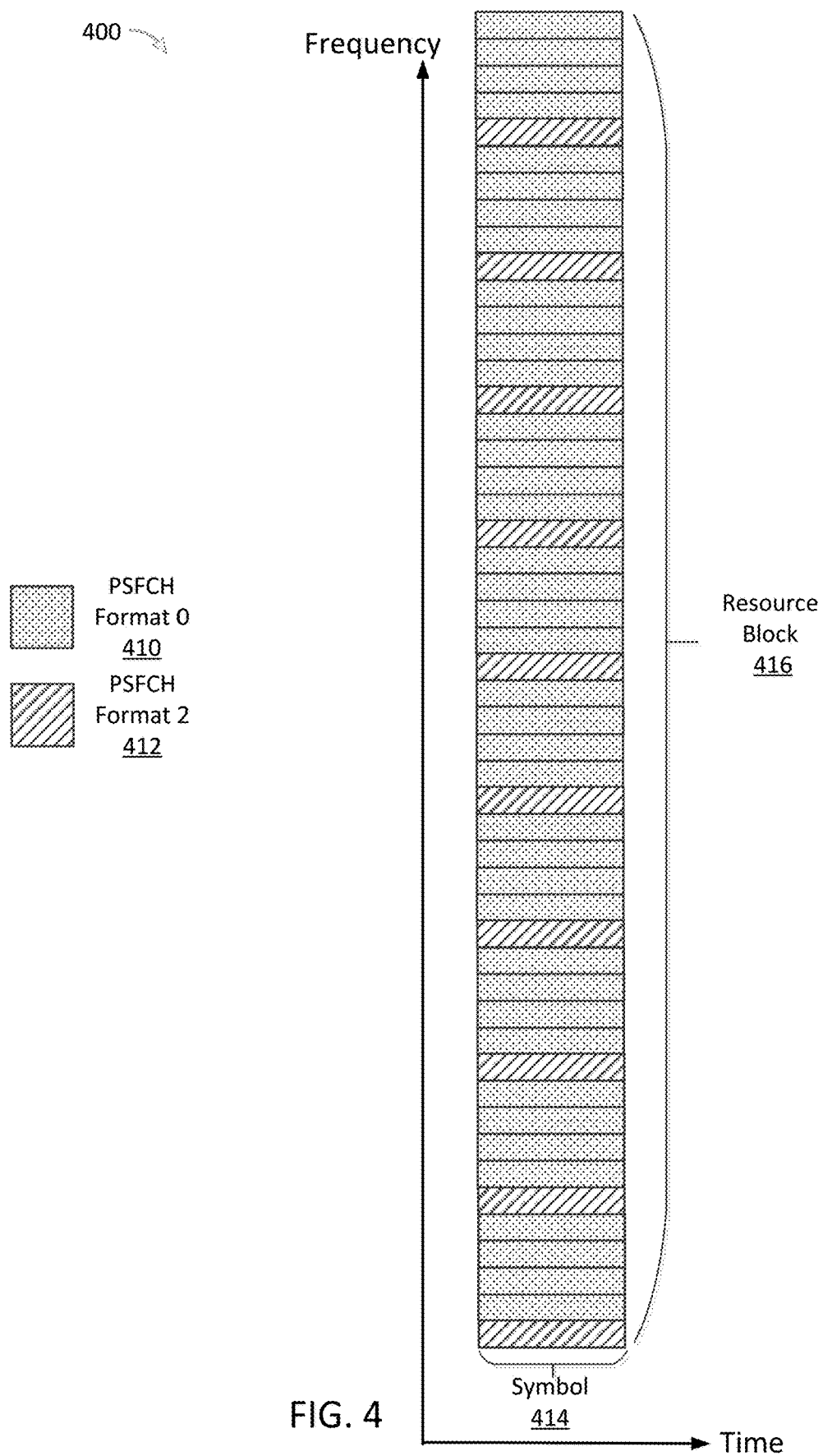
FIG. 4 illustrates resources associated with multiplexed PSFCH transmissions according to some aspects of the present disclosure.

FIG. 4 illustrates resources 400 associated with multiplexed PSFCH transmissions according to some aspects of the present disclosure. The resources 400 may be implemented by aspects of the wireless communications network 100 and/or the wireless communications network 200. For example, the resources 400 may be implemented for communications by one or more UEs, (e.g., UE 115, UE 120, or UE 800) such as described by the wireless communications network 100 and/or 200. In FIG. 4, the x-axis represents time in some arbitrary units, the y-axis represents frequency in some arbitrary units.

In some aspects, a first sidelink UE (e.g., the UE 115, the UE 120, or the UE 800) may receive, from a second sidelink UE (e.g., the UE 115, the UE 120, or the UE 800), a configuration associated with multiplexing a first physical sidelink feedback channel (PSFCH) 410 having a first format with a PSFCH format 2 412 having a second format. In some aspects, the second format may be different from the first format. In this regard, the first sidelink UE may receive the configuration from the second sidelink UE via sidelink control information (SCI), a radio resource control (RRC) message, a medium access control control element (MAC-CE), a PSCCH message, a PSSCH message, or other suitable communication. Additionally or alternatively, the first sidelink UE may operate in sidelink mode 1 and receive the configuration from a network unit (e.g., the BS 105, the CU 210, the DU 230, the RU 240, and/or the network unit 900) via a RRC message, a MAC-CE, a PDSCH message, a PDCCH message, or other suitable communication.

In some aspects, the configuration may indicate a resource pool associated with at least one of the PSFCH format 0 410 or the PSFCH format 2 412. In some aspects, the configuration received by the first sidelink UE may indicate a resource pool associated with at least one of the PSFCH format 0 410 or the PSFCH format 2 412. The resource pool may indicate the time resources (e.g., symbol 414, slots) associated with the PSFCH format 0 410 and/or the PSFCH format 2 412. The resource pool may indicate the frequency resources (e.g., resource block 416, frequency interlace, OCC index, resource elements, subchannels, bandwidth part, frequency spectrum) associated with the PSFCH format 0 410 and/or the PSFCH format 2 412. The first UE may receive an indicator from the second sidelink UE indicating the resources to use for transmitting the PSFCH format 0 410 and/or the PSFCH format 2 412. In this regard, the first UE may receive the indicator from the second sidelink UE via sidelink control information (e.g., SCI-1 and/or SCI-2). For example, a codepoint (e.g., an index) in the SCI may indicate (e.g., dynamically indicate) a set of time/frequency resources from the resource pool that the first sidelink UE should use to transmit the PSFCH format 0 410 and/or the PSFCH format 2 412. The first sidelink UE may receive an indication of resources for each sidelink UE the first sidelink UE is communicating with. For example, the first sidelink UE may receive codepoint(s), index(s), a bitmap, or other suitable indicator to indicate the set of resources the first sidelink UE should use for each sidelink UE the first sidelink UE communicates with. In some aspects, when the first sidelink UE operates in sidelink mode 1, the first sidelink UE may receive the indication of the resource pool from a network unit.

In some aspects, the first sidelink UE (e.g., the UE 115, the UE 120, or the UE 800) may receive one or more transport blocks (TBs) from the second sidelink UE. In this regard, the first sidelink UE may receive the one or more TB(s) via a physical sidelink shared channel (PSSCH). The first sidelink UE may transmit, to the second sidelink UE based on the configuration, an ACK/NACK associated with the one or more TBs received from the second sidelink UE. In this regard, the first sidelink UE may transmit the ACK/NACK to the second sidelink UE via the PSFCH format 0 410 (e.g., PSFCH format 0) multiplexed with the PSFCH format 2 412 (e.g., PSFCH format 2).

In some aspects, the PSFCH format 0 410 configured as PF0 may be multiplexed in the frequency domain with the PSFCH format 2 412 configured as PF2. For example, as shown in FIG. 4, the PSFCH format 0 410 may be frequency interlaced with the PSFCH format 2 412. In this regard, the frequency interlace may use any suitable format. For example, the frequency interlace may repeat over five frequency ranges (e.g., over five subchannels) or over any suitable number of subchannels. For example, the PSFCH format 0 410 may occupy 4 contiguous subchannels with the PSFCH format 2 412 occupying a single subchannel adjacent to the 4 contiguous subchannels. For example, the PSFCH format 2 412 may occupy subchannel index (0) while the PSFCH format 0 410 may occupy subchannel indexes (1) to (4) and the PSFCH format 2 412 may occupy subchannel index (5) while the PSFCH format 0 410 may occupy subchannel indexes (6) to (9), etc. In other instances, other interlace structures may be used. The interlace may be repeated over resource block 416 and/or over a BWP (e.g., a 5 MHz BWP, a 10 MHz BWP, a 20 MHz BWP, a 40 MHz BWP, a 80 MHz BWP, etc.). The PF0/PF2 frequency interlace may be transmitted over a single symbol 414 (e.g., symbol index 12 or other symbol index) and/or over any number of symbols (e.g., any of symbol indexes 0 to 13).

Figure 5:
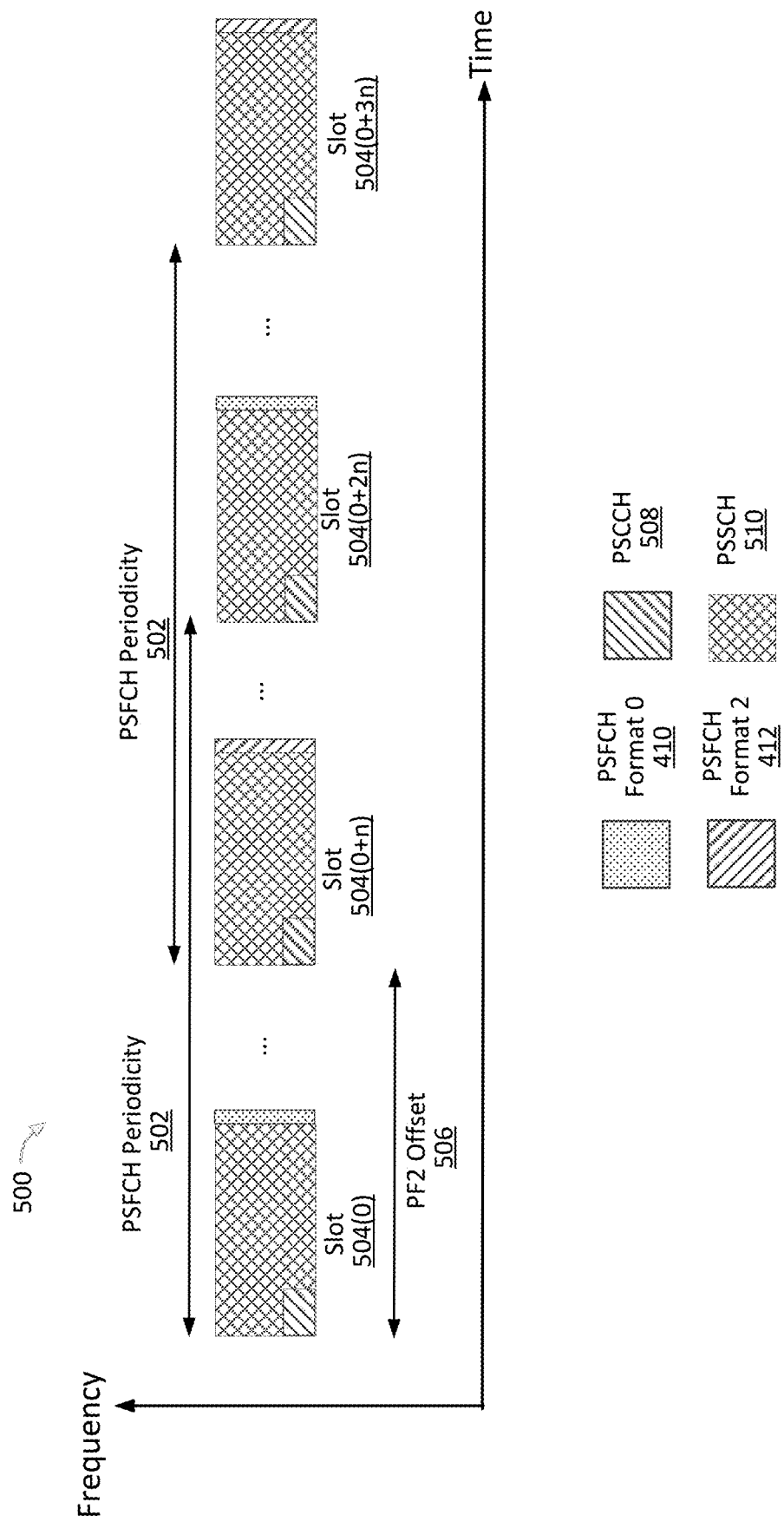
FIG. 5 illustrates periodicities associated with multiplexed PSFCH transmissions according to some aspects of the present disclosure.

FIG. 5 illustrates resources 500 associated with multiplexed PSFCH transmissions according to some aspects of the present disclosure. The resources 500 may be implemented by aspects of the wireless communications network 100 and/or the wireless communications network 200. For example, the resources 500 may be implemented for communications by one or more UEs, (e.g., UE 115, UE 120, or UE 800) such as described by the wireless communications network 100 and/or 200. In FIG. 5, the x-axis represents time in some arbitrary units, the y-axis represents frequency in some arbitrary units.

In some aspects, the first sidelink UE may receive a configuration indicating a PSFCH periodicity 502. The PSFSCH periodicity 502 may indicate the periodicity at which the first sidelink UE should transmit the PSFCH format 0 410 and/or the PSFCH format 2 412. In some aspects, the first sidelink UE may dynamically receive the configuration to multiplex the PSFCH format 0 410 with the PSFCH format 2 412. For example, the configuration may indicate the first sidelink UE should transmit a PSFCH format 0 410 without multiplexing the PSFCH format 0 410 with the PSFCH format 2 412. The first sidelink UE may then receive an updated configuration (e.g., via an RRC reconfiguration message or other suitable message) indicating the first sidelink UE should multiplex the PSFCH format 0 410 with the PSFCH format 2 412. The first sidelink UE may receive updated configurations indicating whether the first sidelink UE should transmit a PSFCH format 0 410 without multiplexing the PSFCH format 0 410 with the PSFCH format 2 412 or whether the first sidelink UE should transmit the PSFCH format 0 410 multiplexed the PSFCH format 2 412. The updated configuration may be based, for example, on an amount of TBs received by the first sidelink UE within a time period. Additionally or alternatively, the updated configuration indicating the first sidelink UE should multiplex the PSFCH format 0 410 with the PSFCH format 2 412 may be valid for a time period after the first sidelink UE receives the updated configuration. After the time period expires, the first sidelink UE may revert back to transmitting a PSFCH format 0 410 without multiplexing the PSFCH format 0 410 with the PSFCH format 2 412.

In some aspects, the PSFCH format 0 410 configured as PF0 may be multiplexed in the time domain with the PSFCH format 2 412 configured as PF2. In this regard, the first sidelink UE may transmit the PSFCH format 0 410 in a single symbol and/or a plurality of symbols (e.g., a plurality of contiguous symbols) at the PSFCH periodicity 502 indicated by the configuration. The PSFCH periodicity 502 may be based on an integer number of slots or sub-slots (e.g., 1, 2, 3, 4, or more slots or sub-slots). For example, the first sidelink UE may transmit the PSFCH format 0 410 in a single symbol in slot 504(0). The first sidelink UE may transmit another PSFCH format 0 410 in a single symbol in slot 504(0+2n) based on the PSFCH periodicity 502. The PSFCH periodicity 502 may be based on an integer number (e.g., n) of slots. The first sidelink UE may transmit the PSFCH format 2 412 in a single symbol and/or a plurality of symbols (e.g., a plurality of contiguous symbols) in slots 504(0+n) and slot 504(0+3) at the PSFCH periodicity 502. However, the PSFCH format 2 412 may be transmitted at an offset in time from the first PSFCH. For example, the PSFCH format 2 412 may be transmitted at a PF2 offset 506 from the PSFCH format 0 410 based on a number of slots or sub-slots (e.g., 1, 2, 3, 4, or more slots or sub-slots offset from the PSFCH format 0 410).

Figure 6:
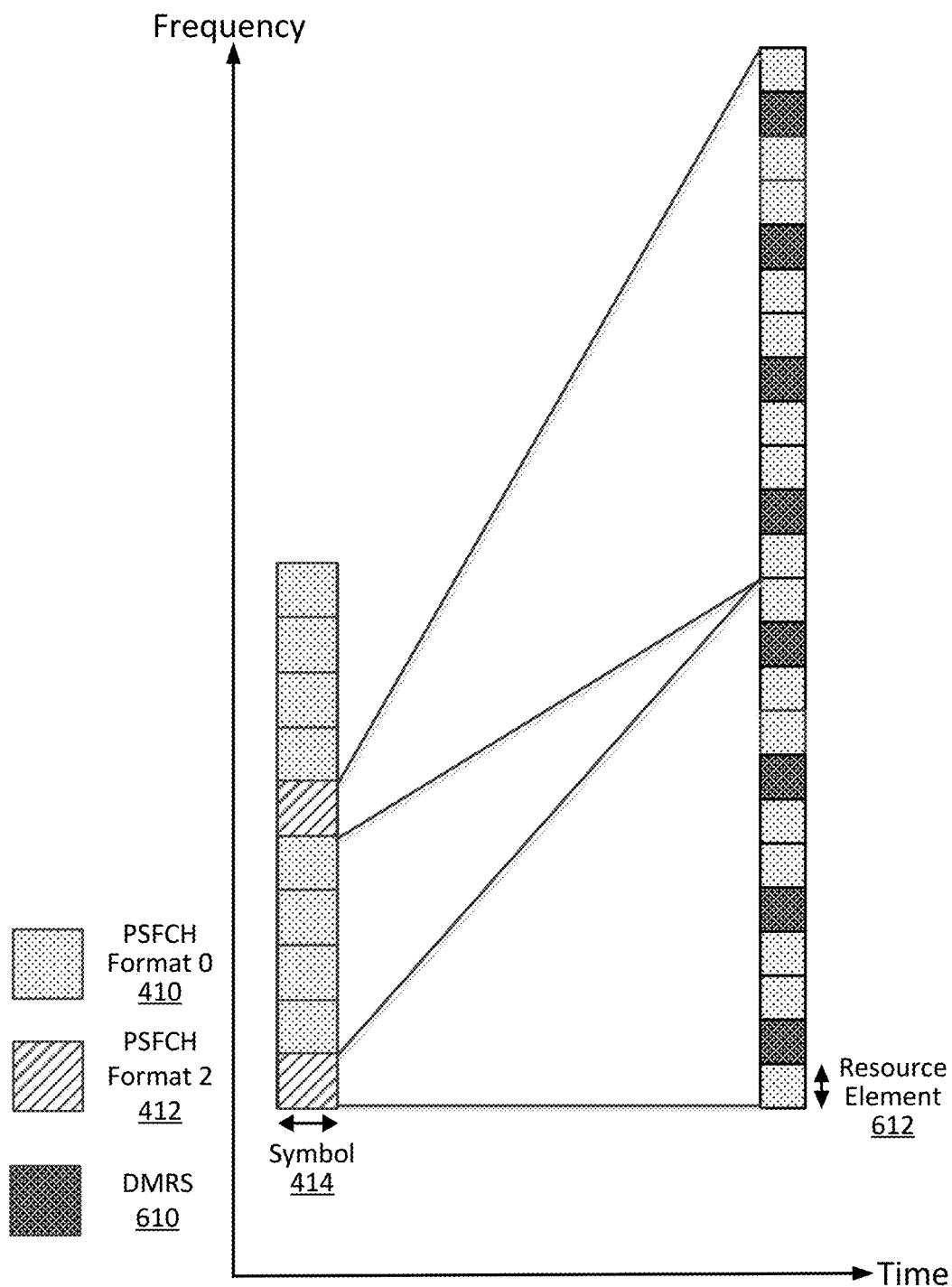
FIG. 6 illustrates resources associated with multiplexed PSFCH transmissions according to some aspects of the present disclosure.

FIG. 6 illustrates resources 600 associated with multiplexed PSFCH transmissions according to some aspects of the present disclosure. The resources 600 may be implemented by aspects of the wireless communications network 100 and/or the wireless communications network 200. For example, the resources 600 may be implemented for communications by one or more UEs, (e.g., UE 115, UE 120, or UE 800) such as described by the wireless communications network 100 and/or 200. In FIG. 6, the x-axis represents time in some arbitrary units, the y-axis represents frequency in some arbitrary units.

In some aspects, the first sidelink UE transmitting the ACK/NACK may apply an orthogonal cover code (OCC) (e.g., OCC2 and/or OCC4) to the PSFCH format 2 412. In some instances, the OCC may enable multiple UEs (including the first sidelink UE) to successfully transmit a PSFCH 412 in format PF2 in a frequency interlace at the same time.

In some aspects, a demodulation reference signal (DMRS) 610 may be frequency interlaced with the first PSFCH format 0 410 and the second PSFCH format PF2 412. For example, the first sidelink UE may frequency division multiplex one or more ACK/NACKs with a DMRS 610 in an OFDM symbol 414 carrying the PSFCH format 2 412. In some aspects, the first sidelink UE may allocate the ACK/NACK feedback information to various resource elements 612 and may allocate the DMRS 610 to other resource elements 612 in accordance with the frequency interlace.

Prior to or after multiplexing the ACK/NACK feedback information with the DMRS 610, the first sidelink UE may apply an orthogonal cover coding (OCC) scheme to the ACK/NACK feedback information in accordance with a quantity of bits included in the feedback information. In other words, the OCC may be based on a quantity of bits transmitted by the ACK/NACK feedback information. The quantity of bits may be based on (e.g., proportional to) the number of TBs received by the first sidelink UE during a time period. For example, a greater number of TBs received by the first sidelink UE may require a greater number of bits transmitted in the ACK/NACK feedback information. In some aspects, the OCC may be a Walsh-Hadamard cover code. The OCC may be a codeword of length 2 (e.g., a code taken from a row of a 2×2 Walsh matrix), length 4 (e.g., a code taken from a row of a 4×4 Walsh matrix) or other suitable length.

In some aspects, another sidelink UE (e.g., a third sidelink UE) may transmit a PSFCH format 2 412 in the same symbol 414 multiplexed in the frequency domain with the PSFCH format 2 414 transmission by the first sidelink UE. The OCCs may enable sidelink UEs that receive the PSFCH format 2 414 transmissions to distinguish DMRS 610 transmissions of the first sidelink UE from DMRS 610 transmissions of the other sidelink UE (e.g., the third sidelink UE). Similarly, the OCCs may enable sidelink UEs that receive the PSFCH format 2 412 transmission to distinguish different PSFCH format 2 ACK/NACK transmissions of the first sidelink UE from PSFCH format 2 ACK/NACK transmissions of the other sidelink UE (e.g., the third sidelink UE).

Figure 7:
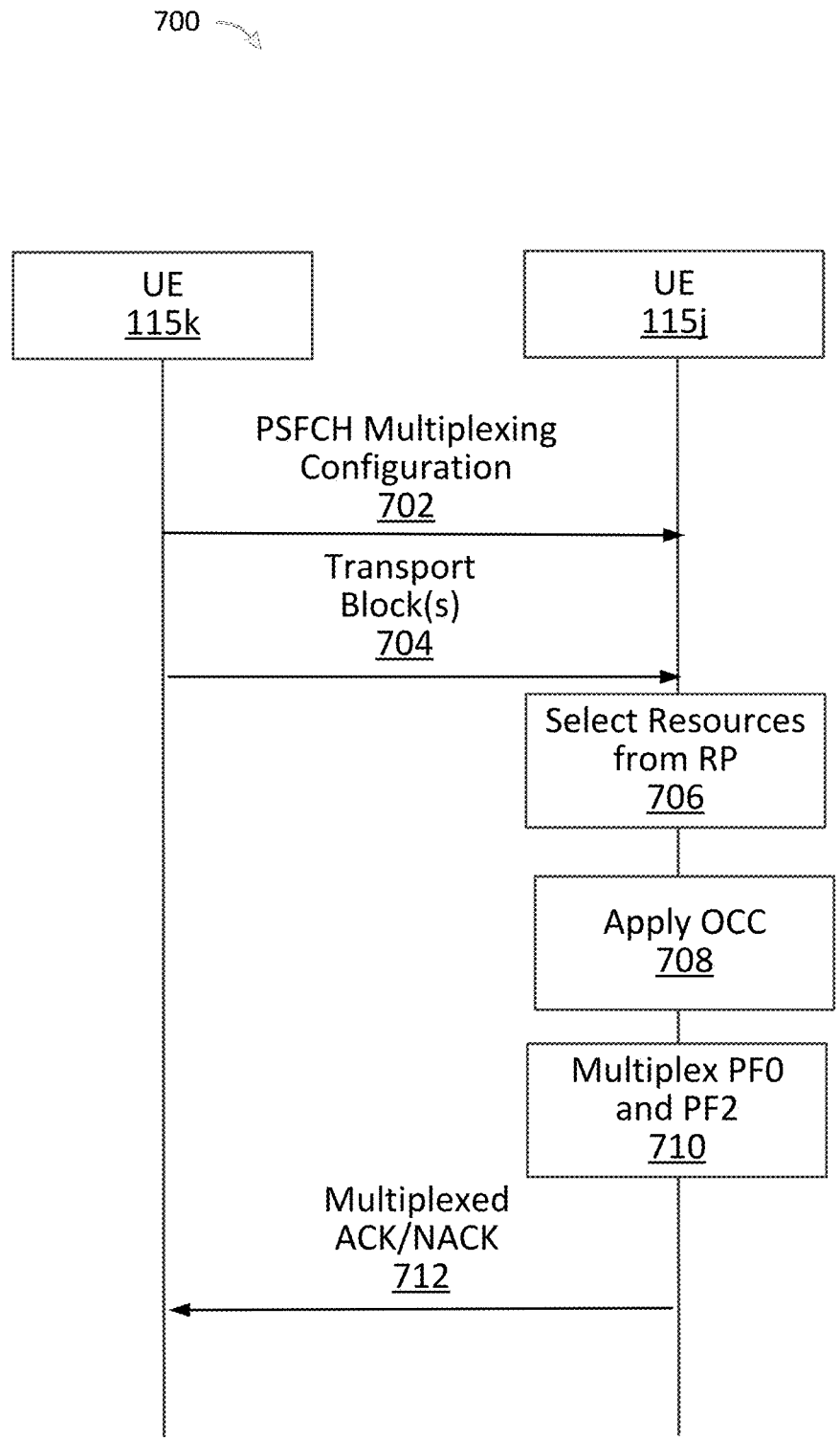
FIG. 7 is a signaling diagram of a wireless communication method according to some aspects of the present disclosure.

FIG. 7 is a signaling diagram of a wireless communication method 700 according to some aspects of the present disclosure. Actions of the communication method 700 can be executed by a computing device (e.g., a processor, processing circuit, and/or other suitable component) of a communication device or other suitable means for performing the actions. For example, a wireless communication device, such as the UE 115, UE 120, or UE 800, may utilize one or more components, such as the processor 802, the memory 804, the PSFCH multiplexing module 808, the transceiver 810, the modem 812, and the one or more antennas 816, to execute aspects of method 700.

At action 702, the UE 115k may transmit a PSFCH multiplexing configuration to the UE 115j. In this regard, the configuration may be associated with multiplexing a first PSFCH having a first format with a second PSFCH having a second format. In some aspects, the second format may be different from the first format. In this regard, the UE 115k may transmit the configuration to the UE 115j via sidelink control information (SCI), a radio resource control (RRC) message, a medium access control control element (MAC-CE), a PSCCH message, a PSSCH message, or other suitable communication. Additionally or alternatively, the UE 115k and/or the UE 115j may operate in sidelink mode 1 and receive the configuration from a network unit (e.g., the BS 105, the CU 210, the DU 230, the RU 240, and/or the network unit 900) via a RRC message, a MAC-CE, a PDSCH message, a PDCCH message, or other suitable communication.

The configuration may indicate a PSFCH periodicity. The PSFSCH periodicity may indicate the periodicity at which the UE 115j should transmit the first PSFCH and/or the second PSFCH to the UE 115k.

The configuration may indicate a resource pool associated with at least one of the first PSFCH or the second PSFCH. The resource pool may indicate the time resources (e.g., symbol(s), slots) associated with the first PSFCH and/or the second PSFCH. The resource pool may indicate the frequency resources (e.g., frequency interlace, OCC index, resource elements, resource blocks, subchannels, bandwidth part, frequency spectrum) associated with the first PSFCH and/or the second PSFCH.

At action 704, the UE 115k may transmit one or more transport blocks (TBs) to the UE 115j. In this regard, the UE 115k may transmit the one or more TB(s) via a physical sidelink shared channel (PSSCH).

At action 706, the UE 115j may select resources from a resource pool. In order to reduce the probability of multiple UEs selecting the same resources for PSFCH transmissions, which may cause PSFCH transmission collisions, in some instances, the UE 115k may monitor the PSFCH resource allocations transmitted by other sidelink UEs. For example, the UE 115k may monitor the SCI transmissions from other sidelink UEs to detect the PSFCH resources selected by and/or in use by other sidelink UEs. The UE 115k may reduce the probability of PSFCH transmission collisions by selecting PSFCH resources that are not selected by or in use by other UEs (e.g., other nearby UEs). Additionally or alternatively, the UE 115k may select the set of PSFCH resources for the UE 115j to use based on a hashing function of an identifier associated with the UE 115k. Selecting the PSFCH resources based on a hashing of the identifier associated with the UE 115k may randomize the resource selection and reduce the probability of two sidelink UEs selecting the same resources thereby reducing the probability of PSFCH transmission collisions.

Additionally or alternatively, when the UE 115k transmits a groupcast message, the UE 115k may select the set of PSFCH resources for the UE 115j to use based on a hashing function of an identifier associated with the groupcast ID and the identifier associated with the UE 115k. For example, the hashing function may be based on an addition of the groupcast ID and the identifier associated with the UE 115k or other combination of the groupcast ID and the identifier associated with the UE 115k. In some aspects, the groupcast ID may be an identifier unique to each sidelink UE receiving the groupcast message. A hashing function based on an addition of the groupcast ID unique to the UE 115j and the identifier associated with the UE 115k may select a unique set of PSFCH resources for the UE 115j to use.

At action 708, the UE 115k may apply an orthogonal cover code (OCC) (e.g., OCC2 and/or OCC4) to the second PSFCH. In some instances, the OCC may enable multiple UEs (including the UE 115j) to successfully transmit a PSFCH in format PF2 in a frequency interlace at the same time.

Prior to or after multiplexing the ACK/NACK feedback information with the DMRS, the UE 115j may apply an OCC scheme to the ACK/NACK feedback information in accordance with a quantity of bits included in the feedback information. In other words, the OCC may be based on a quantity of bits transmitted by the ACK/NACK feedback information. The quantity of bits may be based on (e.g., proportional to) the number of TBs received by the UE 115j at action 704. In some aspects, the OCC may be a Walsh-Hadamard cover code. The OCC may be a codeword of length 2 (e.g., a code taken from a row of a 2×2 Walsh matrix), length 4 (e.g., a code taken from a row of a 4×4 Walsh matrix) or other suitable length.

At action 710, the UE 115j may multiplex a first PSCFH configured as PF0 in the frequency domain with the second PSFCH configured as PF2. For example, the first PSFCH may be frequency interlaced with the second PSFCH. In this regard, the frequency interlace may use any suitable format. For example, the frequency interlace may repeat over five frequency ranges (e.g., over five subchannels) or over any suitable number of subchannels.

Additionally or alternatively, the UE 115*j* may multiplex the first PSFCH configured as PF0 in the time domain with the second PSFCH configured as PF2. In this regard, the UE 115*j* may transmit the first PSFCH in a single symbol and/or a plurality of symbols (e.g., a plurality of contiguous symbols) at the periodicity indicated by the configuration received at action 702. The PSFCH periodicity may be based on an integer number of slots or sub-slots (e.g., 1, 2, 3, 4, or more slots or sub-slots). The UE 115*j* may transmit the second PSFCH in a single symbol and/or a plurality of symbols (e.g., a plurality of contiguous symbols) at the periodicity indicated by the configuration received at action 702. However, the second PSFCH may be transmitted at an offset in time (e.g., PF2 offset 506 as shown in FIG. 5) from the first PSFCH. For example, the second PSFCH may be transmitted at an offset in time from the first PSFCH based on a number of slots or sub-slots (e.g., 1, 2, 3, 4, or more slots or sub-slots offset from the first PSFCH).

At action 712, the UE 115*j* may transmit the multiplexed first PSFCH and second PSFCH to the UE 115*k*.

Figure 8:
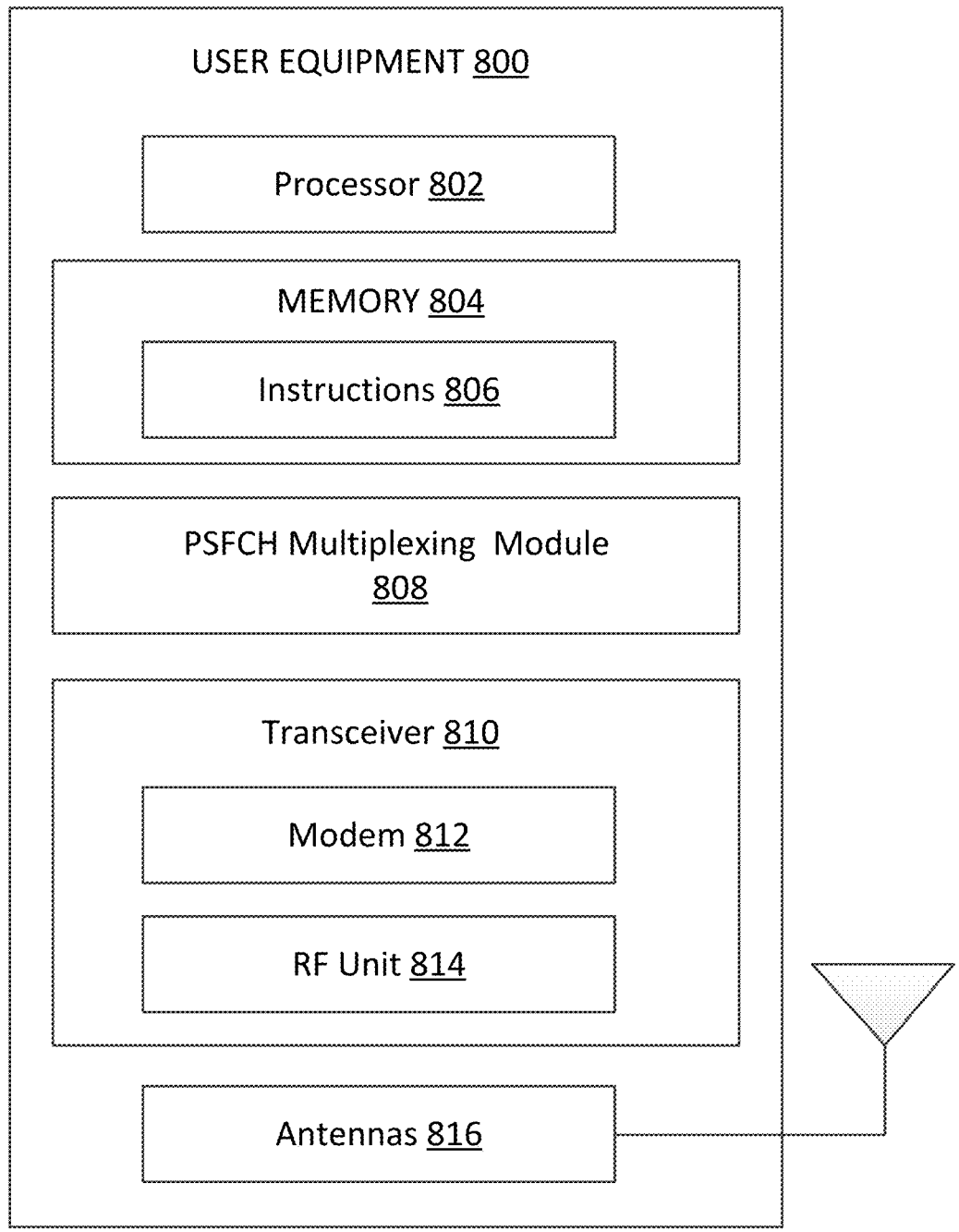
FIG. 8 is a block diagram of an exemplary user equipment (UE) according to some aspects of the present disclosure.

FIG. 8 is a block diagram of an exemplary UE 800 according to some aspects of the present disclosure. The UE 800 may be the UE 115 or the UE 120 in the network 100 or 200 as discussed above. As shown, the UE 800 may include a processor 802, a memory 804, a PSFCH multiplexing module 808, a transceiver 810 including a modem subsystem 812 and a radio frequency (RF) unit 814, and one or more antennas 816. These elements may be coupled with each other and in direct or indirect communication with each other, for example via one or more buses.

The processor 802 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 802 may also be implemented as a combination of computing devices, e.g., a combination of a DSP and a microprocessor, a plurality of microprocessors, one or more microprocessors in conjunction with a DSP core, or any other such configuration.

The memory 804 may include a cache memory (e.g., a cache memory of the processor 802), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 804 includes a non-transitory computer-readable medium. The memory 804 may store instructions 806. The instructions 806 may include instructions that, when executed by the processor 802, cause the processor 802 to perform the operations described herein with reference to the UEs 115 in connection with aspects of the present disclosure, for example, aspects of FIGS. 3-7. Instructions 806 may also be referred to as code. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

The PSFCH multiplexing module 808 may be implemented via hardware, software, or combinations thereof. For example, the PSFCH multiplexing module 808 may be implemented as a processor, circuit, and/or instructions 806 stored in the memory 804 and executed by the processor 802. In some aspects, the PSFCH multiplexing module 808 may be used to receive, from a second sidelink UE, a configuration associated with multiplexing a first physical sidelink feedback channel (PSFCH) having a first format with a second PSFCH having a second format, wherein the second format is different from the first format. The PSFCH multiplexing module 808 may be used to receive, from the second sidelink UE, one or more transport blocks (TBs). The PSFCH multiplexing module 808 may be used to transmit, to the second sidelink UE based on the configuration, an acknowledgement/negative-acknowledgment (ACK/NACK) associated with the one or more TBs via the first PSFCH multiplexed with the second PSFCH.

As shown, the transceiver 810 may include the modem subsystem 812 and the RF unit 814. The transceiver 810 can be configured to communicate bi-directionally with other devices, such as the BSs 105 and/or the UEs 115. The modem subsystem 812 may be configured to modulate and/or encode the data from the memory 804 and the according to a modulation and coding scheme (MCS), e.g., a low-density parity check (LDPC) coding scheme, a turbo coding scheme, a convolutional coding scheme, a digital beamforming scheme, etc. The RF unit 814 may be configured to process (e.g., perform analog to digital conversion or digital to analog conversion, etc.) modulated/encoded data from the modem subsystem 812 (on outbound transmissions) or of transmissions originating from another source such as a UE 115 or a BS 105. The RF unit 814 may be further configured to perform analog beamforming in conjunction with the digital beamforming. Although shown as integrated together in transceiver 810, the modem subsystem 812 and the RF unit 814 may be separate devices that are coupled together to enable the UE 800 to communicate with other devices.

The RF unit 814 may provide the modulated and/or processed data, e.g. data packets (or, more generally, data messages that may contain one or more data packets and other information), to the antennas 816 for transmission to one or more other devices. The antennas 816 may further receive data messages transmitted from other devices. The antennas 816 may provide the received data messages for processing and/or demodulation at the transceiver 810. The antennas 816 may include multiple antennas of similar or different designs in order to sustain multiple transmission links. The RF unit 814 may configure the antennas 816.

In some instances, the UE 800 can include multiple transceivers 810 implementing different RATs (e.g., NR and LTE). In some instances, the UE 800 can include a single transceiver 810 implementing multiple RATs (e.g., NR and LTE). In some instances, the transceiver 810 can include various components, where different combinations of components can implement RATs.

Figure 9:
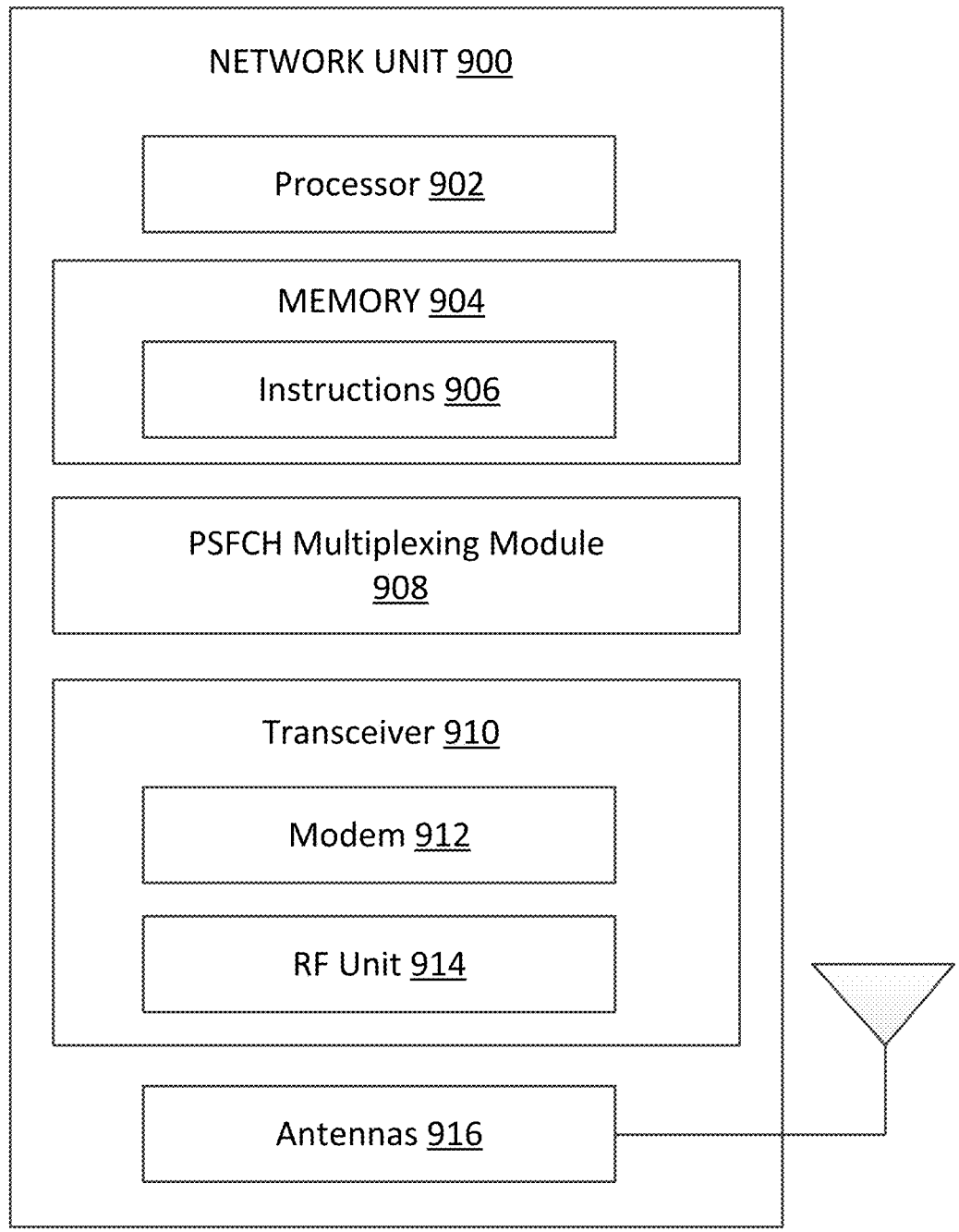
FIG. 9 is a block diagram of an exemplary network unit according to some aspects of the present disclosure.

FIG. 9 is a block diagram of an exemplary network unit 900 according to some aspects of the present disclosure. The network unit 900 may be a BS 105, the CU 210, the DU 230, or the RU 240, as discussed above. As shown, the network unit 900 may include a processor 902, a memory 904, a PSFCH multiplexing module 908, a transceiver 910 including a modem subsystem 912 and a RF unit 914, and one or more antennas 916. These elements may be coupled with each other and in direct or indirect communication with each other, for example via one or more buses.

The processor 902 may have various features as a specific-type processor. For example, these may include a CPU, a DSP, an ASIC, a controller, a FPGA device, another hardware device, a firmware device, or any combination thereof configured to perform the operations described herein. The processor 902 may also be implemented as a combination of computing devices, e.g., a combination of a DSP and a microprocessor, a plurality of microprocessors, one or more microprocessors in conjunction with a DSP core, or any other such configuration.

The memory 904 may include a cache memory (e.g., a cache memory of the processor 902), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 904 may include a non-transitory computer-readable medium. The memory 904 may store instructions 906. The instructions 906 may include instructions that, when executed by the processor 902, cause the processor 902 to perform operations described herein, for example, aspects of FIGS. 3-8. Instructions 906 may also be referred to as code, which may be interpreted broadly to include any type of computer-readable statement(s).

The PSFCH multiplexing module 908 may be implemented via hardware, software, or combinations thereof. For example, the PSFCH multiplexing module 908 may be implemented as a processor, circuit, and/or instructions 906 stored in the memory 904 and executed by the processor 902.

In some aspects, the PSFCH multiplexing module 908 may implement the aspects of FIGS. 3-7. For example, the PSFCH multiplexing module 908 may transmit, to a user equipment (UE), a configuration for multiplexing a first PSFCH and a second PSFCH.

Additionally or alternatively, the PSFCH multiplexing module 908 can be implemented in any combination of hardware and software, and may, in some implementations, involve, for example, processor 902, memory 904, instructions 906, transceiver 910, and/or modem 912.

As shown, the transceiver 910 may include the modem subsystem 912 and the RF unit 914. The transceiver 910 can be configured to communicate bi-directionally with other devices, such as the UEs 115 and/or 600. The modem subsystem 912 may be configured to modulate and/or encode data according to a MCS, e.g., a LDPC coding scheme, a turbo coding scheme, a convolutional coding scheme, a digital beamforming scheme, etc. The RF unit 914 may be configured to process (e.g., perform analog to digital conversion or digital to analog conversion, etc.) modulated/encoded data from the modem subsystem 912 (on outbound transmissions) or of transmissions originating from another source such as a UE 115 or UE 800. The RF unit 914 may be further configured to perform analog beamforming in conjunction with the digital beamforming. Although shown as integrated together in transceiver 910, the modem subsystem 912 and/or the RF unit 914 may be separate devices that are coupled together at the network unit 900 to enable the network unit 900 to communicate with other devices.

The RF unit 914 may provide the modulated and/or processed data, e.g. data packets (or, more generally, data messages that may contain one or more data packets and other information), to the antennas 916 for transmission to one or more other devices. This may include, for example, a configuration indicating a plurality of sub-slots within a slot according to aspects of the present disclosure. The antennas 916 may further receive data messages transmitted from other devices and provide the received data messages for processing and/or demodulation at the transceiver 910. The antennas 916 may include multiple antennas of similar or different designs in order to sustain multiple transmission links.

In some instances, the network unit 900 can include multiple transceivers 910 implementing different RATs (e.g., NR and LTE). In some instances, the network unit 900 can include a single transceiver 910 implementing multiple RATs (e.g., NR and LTE). In some instances, the transceiver 910 can include various components, where different combinations of components can implement RATs.

Figure 10:
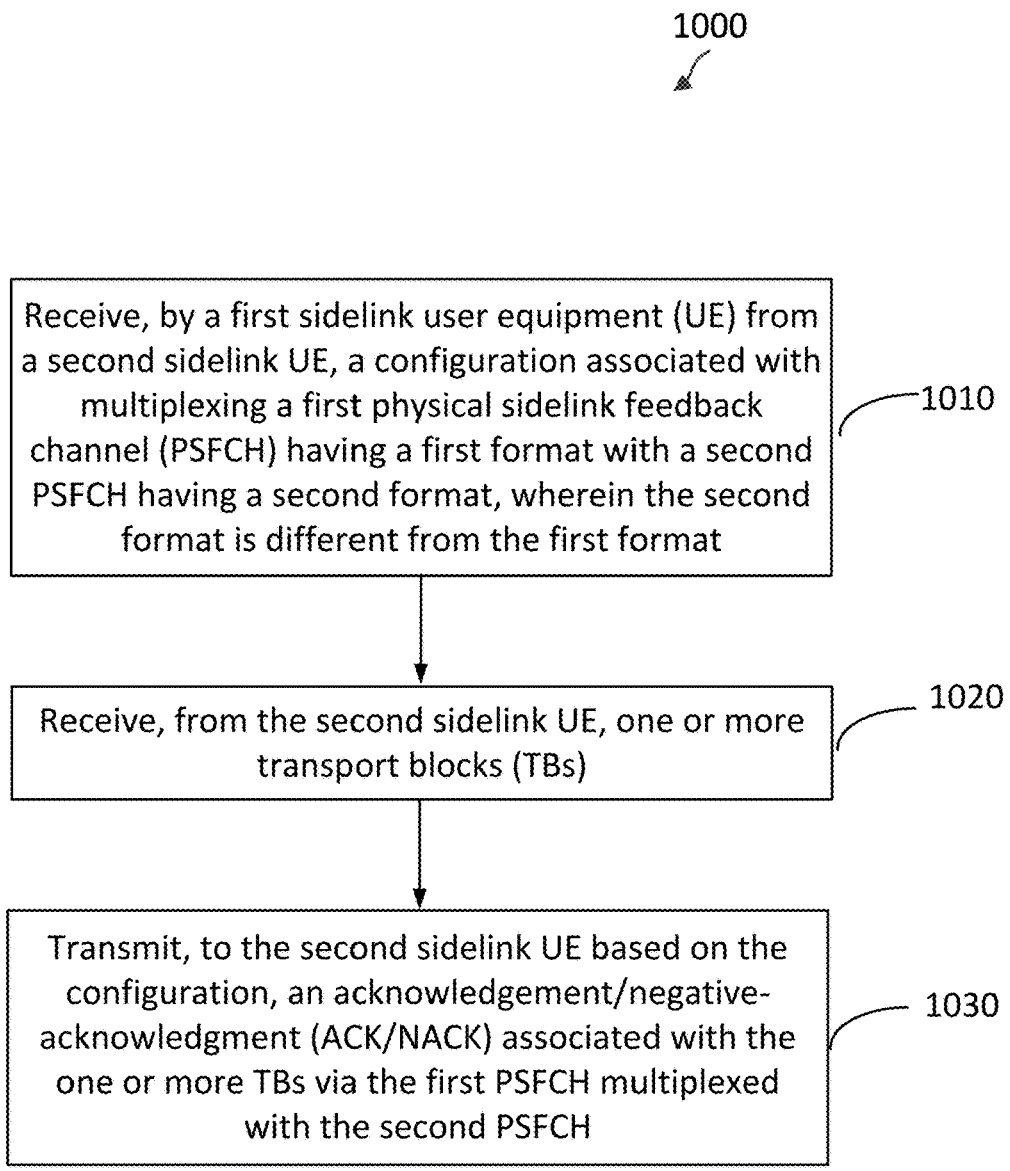
FIG. 10 is a flow diagram of a communication method according to some aspects of the present disclosure.

FIG. 10 is a flow diagram of a communication method 1000 according to some aspects of the present disclosure. Aspects of the method 1000 can be executed by a computing device (e.g., a processor, processing circuit, and/or other suitable component) of a wireless communication device or other suitable means for performing the aspects. For example, a wireless communication device, such as the UE 115, the UE 120, or the UE 800, may utilize one or more components, such as the processor 802, the memory 804, the PSFCH multiplexing module 808, the transceiver 810, the modem 812, and the one or more antennas 816, to execute aspects of method 1000. The method 1000 may employ similar mechanisms as in the networks 100 and 200 and the aspects and actions described with respect to FIGS. 3-7. As illustrated, the method 1000 includes a number of enumerated aspects, but the method 1000 may include additional aspects before, after, and in between the enumerated aspects. In some aspects, one or more of the enumerated aspects may be omitted or performed in a different order.

At action 1010, the method 1000 includes a first sidelink UE (e.g., the UE 115, the UE 120, or the UE 800) receiving, from a second sidelink UE (e.g., the UE 115, the UE 120, or the UE 800), a configuration associated with multiplexing a first physical sidelink feedback channel (PSFCH) having a first format with a second PSFCH having a second format. In some aspects, the second format may be different from the first format. In this regard, the first sidelink UE may receive the configuration from the second sidelink UE via sidelink control information (SCI), a radio resource control (RRC) message, a medium access control control element (MAC-CE), a PSCCH message, a PSSCH message, or other suitable communication. Additionally or alternatively, the first sidelink UE may operate in sidelink mode 1 and receive the configuration from a network unit (e.g., the BS 105, the CU 210, the DU 230, the RU 240, and/or the network unit 900) via a RRC message, a MAC-CE, a PDSCH message, a PDCCH message, or other suitable communication.

In some aspects, the first format may be a PSFCH format 0 (PF0). PSFCH format 0 may be similar to a physical uplink control channel (PUCCH) format 0. PF0 may be a format that carries 1 bit ACK/NACK information. In some aspects, the second format may be a PSFCH format 2. PSFCH format 2 may be similar to a PUCCH format 2. In some aspects, PF2 may use a frequency interlaced PSFCH to carry multiple ACK/NACK bits for HARQ feedback. Additionally or alternatively, the first sidelink UE may apply one or more coding schemes (e.g., orthogonal cover codes) to support multiple ACK/NACK feedback bits. In some instances, the first sidelink UE may apply the one or more coding schemes for the PSFCH resource similarly to how the first sidelink UE 115 may apply a coding scheme to a PUCCH format 2 (PF2) communication. In PF2 format a DMRS may be frequency multiplexed with the ACK/NACK feedback subcarriers.

In some aspects, the configuration may indicate a PSFCH periodicity (e.g., periodicity 502 of FIG. 5). The PSFSCH periodicity may indicate the periodicity at which the first UE should transmit the first PSFCH (e.g., PSFCH format 0 410 of FIGS. 4 and 5) and/or the second PSFCH (e.g., PSFCH format 2 412 of FIGS. 4 and 5).

In some aspects, the first sidelink UE may dynamically receive the configuration to multiplex the first PSFCH with the second PSFCH. For example, the configuration may indicate the first sidelink UE should transmit a first PSFCH without multiplexing the first PSFCH with the second PSFCH. The first sidelink UE may then receive an updated configuration (e.g., via an RRC reconfiguration message or other suitable message) indicating the first sidelink UE should multiplex the first PSFCH with the second PSFCH. The first sidelink UE may receive updated configurations indicating whether the first sidelink UE should transmit a first PSFCH without multiplexing the first PSFCH with the second PSFCH or whether the first sidelink UE should transmit the first PSFCH multiplexed the second PSFCH. The updated configuration may be based, for example, on an amount of TBs received by the first sidelink UE within a time period. Additionally or alternatively, the updated configuration indicating the first sidelink UE should multiplex the first PSFCH with the second PSFCH may be valid for a time period after the first sidelink UE receives the updated configuration. After the time period expires, the first sidelink UE may revert back to transmitting a first PSFCH without multiplexing the first PSFCH with the second PSFCH.

In some aspects, the configuration may indicate a resource pool associated with at least one of the first PSFCH or the second PSFCH. In some aspects, the configuration received by the first sidelink UE at action 1010 may indicate a resource pool associated with at least one of the first PSFCH or the second PSFCH. The resource pool may indicate the time resources (e.g., symbol(s), slots) associated with the first PSFCH and/or the second PSFCH. The resource pool may indicate the frequency resources (e.g., frequency interlace, OCC index, resource elements, resource blocks, subchannels, bandwidth part, frequency spectrum) associated with the first PSFCH and/or the second PSFCH. The first UE may receive an indicator from the second sidelink UE indicating the resources to use for transmitting the first PSFCH and/or the second PSFCH. In this regard, the first UE may receive the indicator from the second sidelink UE via sidelink control information (e.g., SCI-1 and/or SCI-2). For example, a codepoint (e.g., an index) in the SCI may indicate (e.g., dynamically indicate) a set of time/frequency resources from the resource pool that the first sidelink UE should use to transmit the first PSFCH and/or the second PSFCH. The first sidelink UE may receive an indication of resources for each sidelink UE the first sidelink UE is communicating with. For example, the first sidelink UE may receive codepoint(s), index(s), a bitmap, or other suitable indicator to indicate the set of resources the first sidelink UE should use for each sidelink UE the first sidelink UE communicates with. In some aspects, when the first sidelink UE operates in sidelink mode 1, the first sidelink UE may receive the indication of the resource pool from a network unit.

At action 1020, the method 1000 includes the first sidelink UE (e.g., the UE 115, the UE 120, or the UE 800) receiving one or more transport blocks (TBs) from the second sidelink UE. In this regard, the first sidelink UE may receive the one or more TB(s) via a physical sidelink shared channel (PSSCH).

At action 1030, the method 1000 includes the first sidelink UE transmitting, to the second sidelink UE based on the configuration, an ACK/NACK associated with the one or more TBs received at action 1020. In this regard, the first sidelink UE may transmit the ACK/NACK to the second sidelink UE via the first PSFCH (e.g., PSFCH format 0) multiplexed with the second PSFCH (e.g., PSFCH format 2).

In some aspects, the first PSFCH configured as PF0 may be multiplexed in the frequency domain with the second PSFCH configured as PF2. For example, the first PSFCH may be frequency interlaced with the second PSFCH. In this regard, the frequency interlace may use any suitable format. For example, the frequency interlace may repeat over five frequency ranges (e.g., over five subchannels) or over any suitable number of subchannels. For example, the first PSFCH may occupy 4 contiguous subchannels with the second PSFCH occupying a single subchannel adjacent to the 4 contiguous subchannels. For example, the second PSFCH may occupy subchannel index (0) while the first PSFCH may occupy subchannel indexes (1) to (4) and the second PSFCH may occupy subchannel index (5) while the first PSFCH may occupy subchannel indexes (6) to (9), etc. In other instances, other interlace structures may be used. The interlace may be repeated over a portion of a bandwidth part (BWP) and/or over an entire BWP (e.g., a 5 MHz BWP, a 10 MHz BWP, a 20 MHz BWP, a 40 MHz BWP, a 80 MHz BWP, etc.). The PF0/PF2 frequency interlace may be transmitted over a single symbol (e.g., symbol index 12 or other symbol index) and/or over any number of symbols (e.g., any of symbol indexes 0 to 13).

The first sidelink UE may transmit the first PSFCH frequency interlaced with the second PSFCH at the periodicity indicated by the configuration received at action 1010. For example, the first sidelink UE may transmit the first PSFCH frequency interlaced with the second PSFCH at the periodicity 502 as shown in FIG. 5.

In some aspects, the first PSFCH configured as PF0 may be multiplexed in the time domain with the second PSFCH configured as PF2. In this regard, the first sidelink UE may transmit the first PSFCH in a single symbol and/or a plurality of symbols (e.g., a plurality of contiguous symbols) at the periodicity indicated by the configuration received at action 1010. The PSFCH periodicity may be based on an integer number of slots or sub-slots (e.g., 1, 2, 3, 4, or more slots or sub-slots). The first sidelink UE may transmit the second PSFCH in a single symbol and/or a plurality of symbols (e.g., a plurality of contiguous symbols) at the periodicity indicated by the configuration received at action 1010. However, the second PSFCH may be transmitted at an offset in time (e.g., PF2 offset 506 as shown in FIG. 5) from the first PSFCH. For example, the second PSFCH may be transmitted at an offset in time from the first PSFCH based on a number of slots or sub-slots (e.g., 1, 2, 3, 4, or more slots or sub-slots offset from the first PSFCH).

In some aspects, the first UE transmitting the ACK/NACK may include applying an orthogonal cover code (OCC) (e.g., OCC2 and/or OCC4) to the second PSFCH. In some instances, the OCC may enable multiple UEs (including the first sidelink UE) to successfully transmit a PSFCH format PF2 in a frequency interlace at the same time.

In some aspects, a demodulation reference signal (DMRS) may be frequency interlaced with the first PSFCH format 0 and the PSFCH format PF2. For example, the first sidelink UE may frequency division multiplex one or more ACK/NACKs with a DMRS in an OFDM symbol carrying the second PSFCH. In some aspects, the first sidelink UE may allocate the ACK/NACK feedback information to various resource elements and may allocate the DMRS to other resource elements in accordance with the frequency interlace.

Prior to or after multiplexing the ACK/NACK feedback information with the DMRS, the first sidelink UE may apply an orthogonal cover coding (OCC) scheme to the ACK/NACK feedback information in accordance with a quantity of bits included in the feedback information. In other words, the OCC may be based on a quantity of bits transmitted by the ACK/NACK feedback information. The quantity of bits may be based on (e.g., proportional to) the number of TBs received by the first sidelink UE during a time period. For example, a greater number of TBs received by the first sidelink UE may require a greater number of bits transmitted in the ACK/NACK feedback information. In some aspects, the OCC may be a Walsh-Hadamard cover code. The OCC may be a codeword of length 2 (e.g., a code taken from a row of a 2×2 Walsh matrix), length 4 (e.g., a code taken from a row of a 4×4 Walsh matrix) or other suitable length.

In some aspects, another sidelink UE (e.g., a third sidelink UE) may transmit a PSFCH format 2 in the same symbol multiplexed in the frequency domain with the PSFCH format 2 transmission by the first sidelink UE. The OCCs may enable sidelink UEs that receive the PSFCH format 2 transmissions to distinguish DMRS transmissions of the first sidelink UE from DMRS transmissions of the other sidelink UE (e.g., the third sidelink UE). Similarly, the OCCs may enable sidelink UEs that receive the PSFCH format 2 transmission to distinguish different PSFCH format 2 ACK/NACK transmissions of the first sidelink UE from PSFCH format 2 ACK/NACK transmissions of the other sidelink UE (e.g., the third sidelink UE).

In order to reduce the probability of multiple UEs selecting the same resources for PSFCH transmissions, which may cause PSFCH transmission collisions, in some instances the second sidelink UE may monitor the PSFCH resource allocations transmitted by other sidelink UEs. For example, the second sidelink UE may monitor the SCI transmissions from other sidelink UEs to detect the PSFCH resources selected by and/or in use by other sidelink UEs. The second sidelink UE may reduce the probability of PSFCH transmission collisions by selecting PSFCH resources that are not selected by or in use by other UEs (e.g., other nearby UEs). Additionally or alternatively, the second sidelink UE may select the set of PSFCH resources for the first sidelink UE to use based on a hashing function of an identifier associated with the second sidelink UE. Selecting the PSFCH resources based on a hashing of the identifier associated with the second sidelink UE may randomize the resource selection and reduce the probability of two sidelink UEs selecting the same resources thereby reducing the probability of PSFCH transmission collisions.

Additionally or alternatively, when the second sidelink UE transmits a groupcast message, the second sidelink UE may select the set of PSFCH resources for the first sidelink UE to use based on a hashing function of an identifier associated with the groupcast ID and the identifier associated with the second sidelink UE. For example, the hashing function may be based on an addition of the groupcast ID and the identifier associated with the second sidelink UE or other combination of the groupcast ID and the identifier associated with the second sidelink UE.

Figure 11:
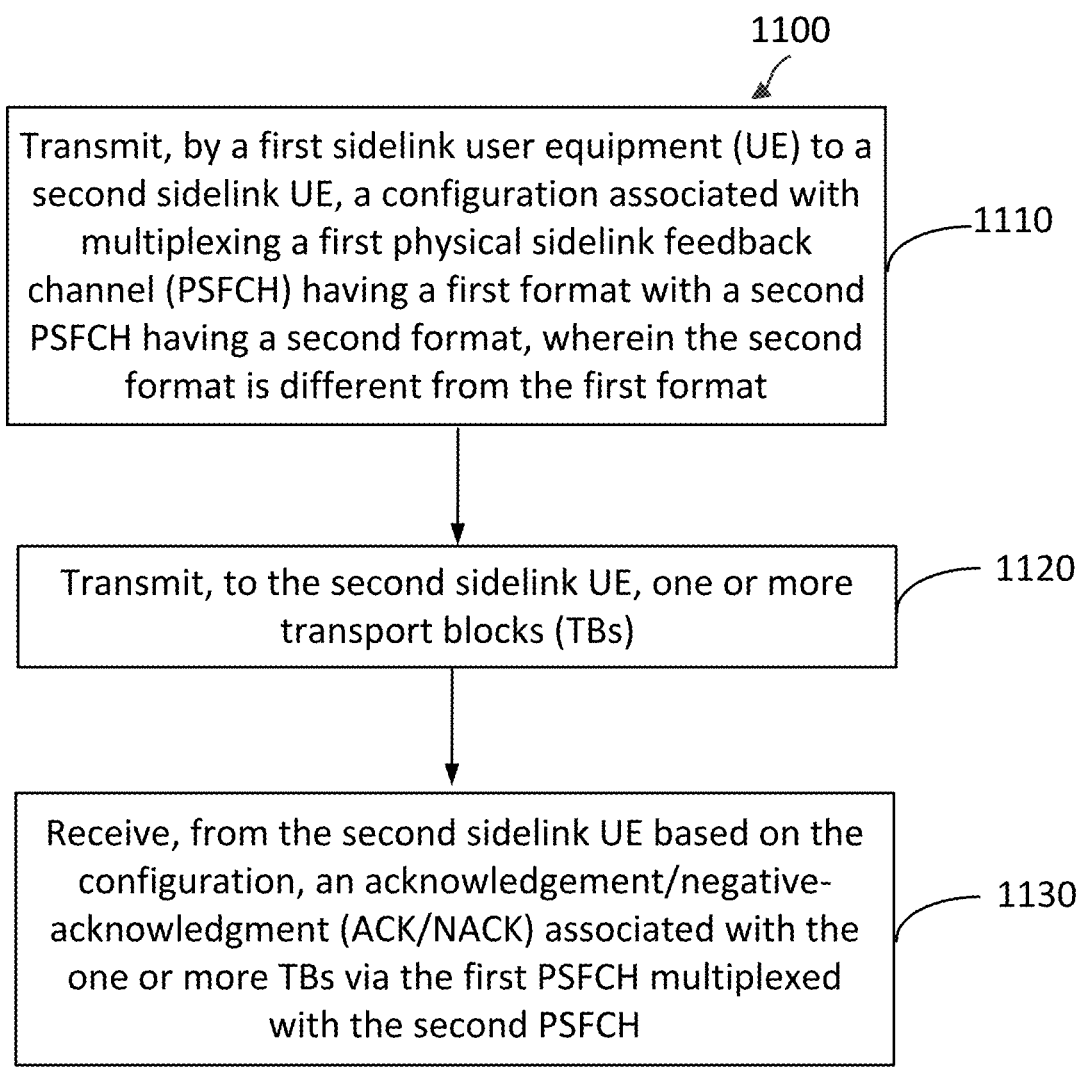
FIG. 11 is a flow diagram of a communication method according to some aspects of the present disclosure.

FIG. 11 is a flow diagram of a communication method 1100 according to some aspects of the present disclosure. Aspects of the method 1100 can be executed by a computing device (e.g., a processor, processing circuit, and/or other suitable component) of a wireless communication device or other suitable means for performing the aspects. For example, a wireless communication device, such as the UE 115, the UE 120, or the UE 800, may utilize one or more components, such as the processor 802, the memory 804, the PSFCH multiplexing module 808, the transceiver 810, the modem 812, and the one or more antennas 816, to execute aspects of method 1100. The method 1100 may employ similar mechanisms as in the networks 100 and 200 and the aspects and actions described with respect to FIGS. 3-7. As illustrated, the method 1100 includes a number of enumerated aspects, but the method 1100 may include additional aspects before, after, and in between the enumerated aspects. In some aspects, one or more of the enumerated aspects may be omitted or performed in a different order.

At action 1110, the method 1100 includes a first sidelink UE (e.g., the UE 115, the UE 120, or the UE 800) transmitting, to a second sidelink UE (e.g., the UE 115, the UE 120, or the UE 800), a configuration associated with multiplexing a first physical sidelink feedback channel (PSFCH) having a first format with a second PSFCH having a second format. In some aspects, the second format may be different from the first format. In this regard, the first sidelink UE may transmit the configuration to the second sidelink UE via sidelink control information (SCI), a radio resource control (RRC) message, a medium access control control element (MAC-CE), a PSCCH message, a PSSCH message, or other suitable communication. Additionally or alternatively, the first sidelink UE may operate in sidelink mode 1 and receive the configuration from a network unit (e.g., the BS 105, the CU 210, the DU 230, the RU 240, and/or the network unit 900) via a RRC message, a MAC-CE, a PDSCH message, a PDCCH message, or other suitable communication before transmitting the configuration to the second sidelink UE.

In some aspects, the first format may be a PSFCH format 0 (PFO). PSFCH format 0 may be similar to a physical uplink control channel (PUCCH) format 0. PFO may be a format that carries 1 bit ACK/NACK information. In some aspects, the second format may be a PSFCH format 2. PSFCH format 2 may be similar to a PUCCH format 2. In some aspects, PF2 may use a frequency interlaced PSFCH to carry multiple ACK/NACK bits for HARQ feedback. Additionally or alternatively, the first sidelink UE may apply one or more coding schemes (e.g., orthogonal cover codes) to support multiple ACK/NACK feedback bits. In some instances, the first sidelink UE may apply the one or more coding schemes for the PSFCH resource similarly to how the first sidelink UE 115 may apply a coding scheme to a PUCCH format 2 (PF2) communication. In PF2 format a DMRS may be frequency multiplexed with the ACK/NACK feedback subcarriers.

In some aspects, the configuration may indicate a PSFCH periodicity (e.g., periodicity 502 of FIG. 5). The PSFSCH periodicity may indicate the periodicity at which the first UE should transmit the first PSFCH (e.g., PSFCH format 0 410 of FIGS. 4 and 5) and/or the second PSFCH (e.g., PSFCH format 2 412 of FIGS. 4 and 5).

In some aspects, the first sidelink UE may dynamically transmit the configuration to multiplex the first PSFCH with the second PSFCH. For example, the configuration may indicate the second sidelink UE should transmit a first PSFCH without multiplexing the first PSFCH with the second PSFCH. The first sidelink UE may then transmit an updated configuration (e.g., via an RRC reconfiguration message or other suitable message) indicating the second sidelink UE should multiplex the first PSFCH with the second PSFCH. The first sidelink UE may transmit updated configurations indicating whether the second sidelink UE should transmit a first PSFCH without multiplexing the first PSFCH with the second PSFCH or whether the second sidelink UE should transmit the first PSFCH multiplexed the second PSFCH. The updated configuration may be based, for example, on an amount of TBs transmitted by the first sidelink UE within a time period. Additionally or alternatively, the updated configuration indicating the second sidelink UE should multiplex the first PSFCH with the second PSFCH may be valid for a time period after the first sidelink UE transmits the updated configuration. After the time period expires, the second sidelink UE may revert back to transmitting a first PSFCH without multiplexing the first PSFCH with the second PSFCH.

In some aspects, the configuration may indicate a resource pool associated with at least one of the first PSFCH or the second PSFCH. In some aspects, the configuration transmitted by the first sidelink UE at action 1110 may indicate a resource pool associated with at least one of the first PSFCH or the second PSFCH. The resource pool may indicate the time resources (e.g., symbol(s), slots) associated with the first PSFCH and/or the second PSFCH. The resource pool may indicate the frequency resources (e.g., frequency interlace, OCC index, resource elements, resource blocks, subchannels, bandwidth part, frequency spectrum) associated with the first PSFCH and/or the second PSFCH. The first UE may transmit an indicator to the second sidelink UE indicating the resources to use for transmitting the first PSFCH and/or the second PSFCH. In this regard, the first UE may transmit the indicator to the second sidelink UE via sidelink control information (e.g., SCI-1 and/or SCI-2). For example, a codepoint (e.g., an index) in the SCI may indicate (e.g., dynamically indicate) a set of time/frequency resources from the resource pool that the second sidelink UE should use to transmit the first PSFCH and/or the second PSFCH. The second sidelink UE may receive an indication of resources for each sidelink UE the second sidelink UE is communicating with. For example, the second sidelink UE may receive codepoint(s), index(s), a bitmap, or other suitable indicator to indicate the set of resources the second sidelink UE should use for each sidelink UE the second sidelink UE communicates with. In some aspects, when the second sidelink UE operates in sidelink mode 1, the second sidelink UE may receive the indication of the resource pool from a network unit.

At action 1120, the method 1100 includes the first sidelink UE (e.g., the UE 115, the UE 120, or the UE 800) transmitting one or more transport blocks (TBs) to the second sidelink UE. In this regard, the first sidelink UE may transmit the one or more TB(s) via a physical sidelink shared channel (PSSCH).

At action 1130, the method 1100 includes the first sidelink UE receiving, from the second sidelink UE based on the configuration, an ACK/NACK associated with the one or more TBs transmitted at action 1120. In this regard, the first sidelink UE may receive the ACK/NACK from the second sidelink UE via the first PSFCH (e.g., PSFCH format 0) multiplexed with the second PSFCH (e.g., PSFCH format 2).

In some aspects, the first PSFCH configured as PF0 may be multiplexed in the frequency domain with the second PSFCH configured as PF2. For example, the first PSFCH may be frequency interlaced with the second PSFCH. In this regard, the frequency interlace may use any suitable format. For example, the frequency interlace may repeat over five frequency ranges (e.g., over five subchannels) or over any suitable number of subchannels. For example, the first PSFCH may occupy 4 contiguous subchannels with the second PSFCH occupying a single subchannel adjacent to the 4 contiguous subchannels. For example, the second PSFCH may occupy subchannel index (0) while the first PSFCH may occupy subchannel indexes (1) to (4) and the second PSFCH may occupy subchannel index (5) while the first PSFCH may occupy subchannel indexes (6) to (9), etc. In other instances, other interlace structures may be used. The interlace may be repeated over a portion of a bandwidth part (BWP) and/or over an entire BWP (e.g., a 5 MHz BWP, a 10 MHz BWP, a 20 MHz BWP, a 40 MHz BWP, a 80 MHz BWP, etc.). The PF0/PF2 frequency interlace may be transmitted over a single symbol (e.g., symbol index 12 or other symbol index) and/or over any number of symbols (e.g., any of symbol indexes 0 to 13).

The first sidelink UE may receive the first PSFCH frequency interlaced with the second PSFCH at the periodicity indicated by the configuration transmitted at action 1110. For example, the first sidelink UE may receive the first PSFCH frequency interlaced with the second PSFCH at the periodicity 502 as shown in FIG. 5.

In some aspects, the first PSFCH configured as PF0 may be multiplexed in the time domain with the second PSFCH configured as PF2. In this regard, the first sidelink UE may receive the first PSFCH in a single symbol and/or a plurality of symbols (e.g., a plurality of contiguous symbols) at the periodicity indicated by the configuration transmitted at action 1110. The PSFCH periodicity may be based on an integer number of slots or sub-slots (e.g., 1, 2, 3, 4, or more slots or sub-slots). The first sidelink UE may receive the second PSFCH in a single symbol and/or a plurality of symbols (e.g., a plurality of contiguous symbols) at the periodicity indicated by the configuration transmitted at action 1110. However, the second PSFCH may be received at an offset in time (e.g., PF2 offset 506 as shown in FIG. 5) from the first PSFCH. For example, the second PSFCH may be received at an offset in time from the first PSFCH based on a number of slots or sub-slots (e.g., 1, 2, 3, 4, or more slots or sub-slots offset from the first PSFCH).

In some aspects, the second UE transmitting the ACK/NACK may include applying an orthogonal cover code (OCC) (e.g., OCC2 and/or OCC4) to the second PSFCH. In some instances, the OCC may enable multiple UEs (including the second sidelink UE) to successfully transmit a PSFCH format PF2 in a frequency interlace at the same time.

In some aspects, a demodulation reference signal (DMRS) may be frequency interlaced with the first PSFCH format 0 and the PSFCH format PF2. For example, the second sidelink UE may frequency division multiplex one or more ACK/NACKs with a DMRS in an OFDM symbol carrying the second PSFCH. In some aspects, the second sidelink UE may allocate the ACK/NACK feedback information to various resource elements and may allocate the DMRS to other resource elements in accordance with the frequency interlace.

Prior to or after multiplexing the ACK/NACK feedback information with the DMRS, the second sidelink UE may apply an orthogonal cover coding (OCC) scheme to the ACK/NACK feedback information in accordance with a quantity of bits included in the feedback information. In other words, the OCC may be based on a quantity of bits transmitted by the ACK/NACK feedback information. The quantity of bits may be based on (e.g., proportional to) the number of TBs received by the second sidelink UE during a time period. For example, a greater number of TBs received by the second sidelink UE may require a greater number of bits transmitted in the ACK/NACK feedback information. In some aspects, the OCC may be a Walsh-Hadamard cover code. The OCC may be a codeword of length 2 (e.g., a code taken from a row of a 2×2 Walsh matrix), length 4 (e.g., a code taken from a row of a 4×4 Walsh matrix) or other suitable length.

In some aspects, another sidelink UE (e.g., a third sidelink UE) may transmit a PSFCH format 2 in the same symbol multiplexed in the frequency domain with the PSFCH format 2 transmission by the second sidelink UE. The OCCs may enable sidelink UEs that receive the PSFCH format 2 transmissions to distinguish DMRS transmissions of the second sidelink UE from DMRS transmissions of the other sidelink UE (e.g., the third sidelink UE). Similarly, the OCCs may enable the first sidelink UE that receives the PSFCH format 2 transmission to distinguish different PSFCH format 2 ACK/NACK transmissions of the second sidelink UE from PSFCH format 2 ACK/NACK transmissions of the other sidelink UE (e.g., the third sidelink UE).

In order to reduce the probability of multiple UEs selecting the same resources for PSFCH transmissions, which may cause PSFCH transmission collisions, in some instances, the first sidelink UE may monitor the PSFCH resource allocations transmitted by other sidelink UEs. For example, the first sidelink UE may monitor the SCI transmissions from other sidelink UEs to detect the PSFCH resources selected by and/or in use by other sidelink UEs. The first sidelink UE may reduce the probability of PSFCH transmission collisions by selecting PSFCH resources that are not selected by or in use by other UEs (e.g., other nearby UEs). Additionally or alternatively, the first sidelink UE may select the set of PSFCH resources for the second sidelink UE to use based on a hashing function of an identifier associated with the first sidelink UE. Selecting the PSFCH resources based on a hashing of the identifier associated with the first sidelink UE may randomize the resource selection and reduce the probability of two sidelink UEs selecting the same resources thereby reducing the probability of PSFCH transmission collisions.

Additionally or alternatively, when the first sidelink UE transmits a groupcast message, the first sidelink UE may select the set of PSFCH resources for the second sidelink UE to use based on a hashing function of an identifier associated with the groupcast ID and the identifier associated with the first sidelink UE. For example, the hashing function may be based on an addition of the groupcast ID and the identifier associated with the first sidelink UE or other combination of the groupcast ID and the identifier associated with the first sidelink UE.

Further aspects of the present disclosure include the following:

Aspect 1 includes a method of wireless communication performed by a first sidelink user equipment (UE), the method comprising receiving, from a second sidelink UE, a configuration associated with multiplexing a first physical sidelink feedback channel (PSFCH) having a first format with a second PSFCH having a second format, wherein the second format is different from the first format; receiving, from the second sidelink UE, one or more transport blocks (TBs); and transmitting, to the second sidelink UE based on the configuration, an acknowledgement/negative-acknowledgment (ACK/NACK) associated with the one or more TBs via the first PSFCH multiplexed with the second PSFCH.

Aspect 2 includes the method of aspect 1, wherein the first format is a PSFCH format 0; and the second format is a PSFCH format 2.

Aspect 3 includes the method of any of aspects 1-2, wherein the transmitting the ACK/NACK comprises at least one of transmitting the ACK/NACK via the first PSFCH multiplexed in a time domain with the second PSFCH; or transmitting the ACK/NACK via the first PSFCH multiplexed in a frequency domain with the second PSFCH.

Aspect 4 includes the method of any of aspects 1-3, wherein the transmitting the ACK/NACK comprises transmitting the ACK/NACK via the first PSFCH using a first frequency interlace; and transmitting the ACK/NACK via the second PSFCH using a second frequency interlace, wherein the second frequency interlace is different from the first frequency interlace.

Aspect 5 includes the method of any of aspects 1-4, wherein the configuration indicates a PSFCH periodicity; and the transmitting the ACK/NACK comprises transmitting the ACK/NACK via the first PSFCH based on the PSFCH periodicity; and transmitting the ACK/NACK via the second PSFCH based on the PSFCH periodicity offset in time from the first PSFCH.

Aspect 6 includes the method of any of aspects 1-5, wherein the second format is a PSFCH format 2; and the transmitting the ACK/NACK further comprises applying an orthogonal cover code to the second PSFCH.

Aspect 7 includes the method of any of aspects 1-6, wherein the receiving the configuration comprises receiving the configuration via a radio resource control message.

Aspect 8 includes the method of any of aspects 1-7, wherein the configuration indicates a resource pool associated with at least one of the first PSFCH or the second PSFCH; and further comprising receiving, from the second sidelink UE, sidelink control information (SCI) indicating at least one of first resources of the resource pool associated with the first PSFCH; or second resources of the resource pool associated with the second PSFCH.

Aspect 9 includes the method of any of aspects 1-8, wherein the configuration indicates a resource pool associated with at least one of the first PSFCH or the second PSFCH; and further comprising selecting, from the resource pool based on a hashing function of at least one of a groupcast identifier or an identifier associated with the second sidelink UE, at least one of first resources associated with the first PSFCH; or second resources associated with the second PSFCH.

Aspect 10 includes a method of wireless communication performed by a first sidelink user equipment (UE), the method comprising transmitting, to a second sidelink UE, a configuration associated with multiplexing a first physical sidelink feedback channel (PSFCH) having a first format with a second PSFCH having a second format, wherein the second format is different from the first format; transmitting, to the second sidelink UE, one or more transport blocks (TBs); and receiving, from the second sidelink UE, an acknowledgement/negative-acknowledgment (ACK/NACK) associated with the one or more TBs via the first PSFCH multiplexed with the second PSFCH.

Aspect 11 includes the method of aspect 10, wherein the first format is a PSFCH format 0; and the second format is a PSFCH format 2.

Aspect 12 includes the method of any of aspects 10-11, wherein the receiving the ACK/NACK comprises at least one of receiving the ACK/NACK via the first PSFCH multiplexed in a time domain with the second PSFCH; or receiving the ACK/NACK via the first PSFCH multiplexed in a frequency domain with the second PSFCH.

Aspect 13 includes the method of any of aspects 10-12, wherein the receiving the ACK/NACK comprises receiving the ACK/NACK via the first PSFCH using a first frequency interlace; and receiving the ACK/NACK via the second PSFCH using a second frequency interlace, wherein the second frequency interlace is different from the first frequency interlace.

Aspect 14 includes the method of any of aspects 10-13, wherein the configuration indicates a PSFCH periodicity; and the receiving the ACK/NACK comprises receiving the ACK/NACK via the first PSFCH based on the PSFCH periodicity; and receiving the ACK/NACK via the second PSFCH based on the PSFCH periodicity offset in time from the first PSFCH.

Aspect 15 includes the method of any of aspects 10-14, wherein the second format is a PSFCH format 2; and the receiving the ACK/NACK comprises receiving the second PSFCH coded via an orthogonal cover code.

Aspect 16 includes a non-transitory computer-readable medium storing one or more instructions for wireless communication, the one or more instructions comprising one or more instructions that, when executed by one or more processors of a first sidelink user equipment (UE), cause the first sidelink UE to perform any one of aspects 1-9.

Aspect 17 includes a non-transitory computer-readable medium storing one or more instructions for wireless communication, the one or more instructions comprising one or more instructions that, when executed by one or more processors of a first sidelink user equipment (UE), cause the first sidelink UE to perform any one of aspects 10-15.

Aspect 18 includes a first sidelink user equipment (UE) comprising one or more means to perform any one or more of aspects 1-9.

Aspect 19 includes a first sidelink user equipment (UE) comprising one or more means to perform any one or more of aspects 10-15.

Aspect 20 includes a first sidelink user equipment (UE) comprising a memory, a transceiver, and at least one processor coupled to the memory and the transceiver, wherein the first sidelink UE is configured to perform any one or more of aspects 1-9.

Aspect 21 includes a first sidelink user equipment (UE) comprising a memory, a transceiver, and at least one processor coupled to the memory and the transceiver, wherein the first sidelink UE is configured to perform any one or more of aspects 10-15.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a first sidelink user equipment (UE), the method comprising:
   receiving, from a second sidelink UE, a configuration indicating a physical sidelink feedback channel (PSFCH) resource pool associated with multiplexing a first PSFCH having a first format with a second PSFCH having a second format, wherein the second format is different from the first format;
   receiving, from the second sidelink UE, one or more transport blocks (TBs) via a groupcast message with a groupcast ID;
   selecting, from the resource pool based on a hashing function of an addition of the groupcast ID with an identifier associated with the second sidelink UE, first resources associated with the first PSFCH; and
   transmitting, to the second sidelink UE based on the configuration, an acknowledgement/negative-acknowledgment (ACK/NACK) associated with the one or more TBs via the first PSFCH using the first resources and a second ACK/NACK via the second PSFCH multiplexed with the first PSFCH.

2. The method of claim 1, wherein:
   the first format is a PSFCH format 0; and
   the second format is a PSFCH format 2.

3. The method of claim 1, wherein the transmitting the ACK/NACK comprises at least one of:
   transmitting the ACK/NACK via the first PSFCH multiplexed in a time domain with the second PSFCH; or
   transmitting the ACK/NACK via the first PSFCH multiplexed in a frequency domain with the second PSFCH.

4. The method of claim 1, wherein the transmitting the ACK/NACK comprises:
   transmitting the ACK/NACK via the first PSFCH using a first frequency interlace; and transmitting the ACK/NACK via the second PSFCH using a second frequency interlace, wherein the second frequency interlace is different from the first frequency interlace.

5. The method of claim 1, wherein the configuration indicates a PSFCH periodicity; and
the transmitting the ACK/NACK comprises:
transmitting the ACK/NACK via the first PSFCH based on the PSFCH periodicity; and
transmitting the ACK/NACK via the second PSFCH based on the PSFCH periodicity offset in time from the first PSFCH.

6. The method of claim 1, wherein:
the second format is a PSFCH format 2; and
the transmitting the ACK/NACK further comprises applying an orthogonal cover code to the second PSFCH.

7. The method of claim 1, wherein the receiving the configuration comprises receiving the configuration via a radio resource control message.

8. The method of claim 1, wherein the configuration indicates a resource pool associated with the first PSFCH and the second PSFCH; and further comprising:
receiving, from the second sidelink UE, sidelink control information (SCI) indicating:
first resources of the resource pool associated with the first PSFCH; and
second resources of the resource pool associated with the second PSFCH.

9. The method of claim 1, further comprising:
selecting, from the resource pool based on a hashing function of at least one of a groupcast identifier or an identifier associated with the second sidelink UE, second resources associated with the second PSFCH.

10. A method of wireless communication performed by a first sidelink user equipment (UE), the method comprising:
transmitting, to a second sidelink UE, a configuration indicating a physical sidelink feedback channel (PSFCH) resource pool associated with multiplexing a first PSFCH having a first format with a second PSFCH having a second format, wherein the second format is different from the first format;
transmitting, to the second sidelink UE, one or more transport blocks (TBs) via a groupcast message with a groupcast ID; and
receiving, from the second sidelink UE, an acknowledgement/negative-acknowledgment (ACK/NACK) associated with the one or more TBs via the first PSFCH via first resources and a second ACK/NACK via the second PSFCH multiplexed with the first PSFCH,
wherein the first resources are selected from the resource pool based on a hashing function of an addition of the groupcast ID with an identifier associated with the first sidelink UE.

11. The method of claim 10, wherein:
the first format is a PSFCH format 0; and
the second format is a PSFCH format 2.

12. The method of claim 10, wherein the receiving the ACK/NACK comprises at least one of:
receiving the ACK/NACK via the first PSFCH multiplexed in a time domain with the second PSFCH; or
receiving the ACK/NACK via the first PSFCH multiplexed in a frequency domain with the second PSFCH.

13. The method of claim 10, wherein the receiving the ACK/NACK comprises:
receiving the ACK/NACK via the first PSFCH using a first frequency interlace; and receiving the ACK/NACK via the second PSFCH using a second frequency interlace, wherein the second frequency interlace is different from the first frequency interlace.

14. The method of claim 10, wherein the configuration indicates a PSFCH periodicity; and
the receiving the ACK/NACK comprises:
receiving the ACK/NACK via the first PSFCH based on the PSFCH periodicity; and
receiving the ACK/NACK via the second PSFCH based on the PSFCH periodicity offset in time from the first PSFCH.

15. The method of claim 10, wherein:
the second format is a PSFCH format 2; and
the receiving the ACK/NACK comprises receiving the second PSFCH coded via an orthogonal cover code.

16. A first sidelink user equipment (UE) comprising:
a memory;
a transceiver; and
at least one processor coupled to the memory and the transceiver, wherein the first sidelink UE is configured to:
receive, from a second sidelink UE, a configuration indicating a physical sidelink feedback channel (PSFCH) resource pool associated with multiplexing a PSFCH having a first format with a second PSFCH having a second format, wherein the second format is different from the first format;
receive, from the second sidelink UE, one or more transport blocks (TBs) via a groupcast message with a groupcast ID;
selecting, from the resource pool based on a hashing function of an addition of the groupcast ID with an identifier associated with the second sidelink UE, first resources associated with the first PSFCH; and
transmit, to the second sidelink UE based on the configuration, an acknowledgement/negative-acknowledgment (ACK/NACK) associated with the one or more TBs via the first PSFCH using the first resources and a second ACK/NACK via the second PSFCH multiplexed with the first PSFCH.

17. The first sidelink UE of claim 16, wherein:
the first format is a PSFCH format 0; and
the second format is a PSFCH format 2.

18. The first sidelink UE of claim 16, wherein the first sidelink UE is further configured to at least one of:
transmit the ACK/NACK via the first PSFCH multiplexed in a time domain with the second PSFCH; or
transmit the ACK/NACK via the first PSFCH multiplexed in a frequency domain with the second PSFCH.

19. The first sidelink UE of claim 16, wherein the first sidelink UE is further configured to at least one of:
transmit the ACK/NACK via the first PSFCH using a first frequency interlace; and
transmit the ACK/NACK via the second PSFCH using a second frequency interlace, wherein the second frequency interlace is different from the first frequency interlace.

20. The first sidelink UE of claim 16, wherein the configuration indicates a PSFCH periodicity; and
the first sidelink UE is further configured to:
transmit the ACK/NACK via the first PSFCH based on the PSFCH periodicity; and
transmit the ACK/NACK via the second PSFCH based on the PSFCH periodicity offset in time from the first PSFCH.

21. The first sidelink UE of claim 16, wherein the second format is a PSFCH format 2; and
the first sidelink UE is further configured to:
apply an orthogonal cover code to the second PSFCH.

22. The first sidelink UE of claim 16, wherein the first sidelink UE is further configured to receive the configuration via a radio resource control message.

23. The first sidelink UE of claim 16, wherein the configuration indicates a resource pool associated with the first PSFCH and the second PSFCH; and
the first sidelink UE is further configured to:
receive, from the second sidelink UE, sidelink control information (SCI) indicating:
first resources of the resource pool associated with the first PSFCH; and
second resources of the resource pool associated with the second PSFCH.

24. The first sidelink UE of claim 16, wherein the first sidelink UE is further configured to:
select, from the resource pool based on a hashing function of at least one of a groupcast identifier or an identifier associated with the second sidelink UE, second resources associated with the second PSFCH.

25. A first sidelink user equipment (UE) comprising:
a memory;
a transceiver; and
at least one processor coupled to the memory and the transceiver, wherein the first sidelink UE is configured to:
transmit, to a second sidelink UE, a configuration indicating a physical sidelink feedback channel (PSFCH) resource pool associated with multiplexing a first PSFCH having a first format with a second PSFCH having a second format, wherein the second format is different from the first format;
transmit, to the second sidelink UE, one or more transport blocks (TBs) via a groupcast message with a groupcast ID; and
receive, from the second sidelink UE, an acknowledgement/negative-acknowledgment (ACK/NACK) associated with the one or more TBs via the first PSFCH via first resources and a second ACK/NACK via the second PSFCH multiplexed with the first PSFCH,
wherein the first resources are selected from the resource pool based on a hashing function of an addition of the groupcast ID with an identifier associated with the first sidelink UE.

26. The first sidelink UE of claim 25, wherein:
the first format is a PSFCH format 0; and
the second format is a PSFCH format 2.

27. The first sidelink UE of claim 25, wherein the first sidelink UE is further configured to at least one of:
receive the ACK/NACK via the first PSFCH multiplexed in a time domain with the second PSFCH; or
receive the ACK/NACK via the first PSFCH multiplexed in a frequency domain with the second PSFCH.

28. The first sidelink UE of claim 25, wherein the first sidelink UE is further configured to:
receive the ACK/NACK via the first PSFCH using a first frequency interlace; and
receive the ACK/NACK via the second PSFCH using a second frequency interlace, wherein the second frequency interlace is different from the first frequency interlace.

29. The first sidelink UE of claim 25, wherein the configuration indicates a PSFCH periodicity; and
the first sidelink UE is further configured to:
receive the ACK/NACK via the first PSFCH based on the PSFCH periodicity; and
receive the ACK/NACK via the second PSFCH based on the PSFCH periodicity offset in time from the first PSFCH.

30. The first sidelink UE of claim 25, wherein:
the second format is a PSFCH format 2; and
the first sidelink UE is further configured to receive the second PSFCH coded via an orthogonal cover code.

* * * * *